US009866138B2

(12) United States Patent
Oates et al.

(10) Patent No.: US 9,866,138 B2
(45) Date of Patent: Jan. 9, 2018

(54) VOLTAGE SOURCE CONVERTER AND CONTROL THEREOF

(71) Applicant: General Electric Technology GmbH, Baden (CH)

(72) Inventors: Colin Donald Murray Oates, Stafford (GB); Kevin Dyke, Stafford (GB); David Reginald Trainer, Stafford (GB)

(73) Assignee: GENERAL ELECTRIC COMPANY GMBH (CH)

( * ) Notice: Subject to any disclaimer, the term of this patent is extended or adjusted under 35 U.S.C. 154(b) by 0 days.

(21) Appl. No.: 15/128,262

(22) PCT Filed: Mar. 23, 2015

(86) PCT No.: PCT/EP2015/056139
§ 371 (c)(1),
(2) Date: Sep. 22, 2016

(87) PCT Pub. No.: WO2015/144644
PCT Pub. Date: Oct. 1, 2015

(65) Prior Publication Data
US 2017/0099007 A1    Apr. 6, 2017

(30) Foreign Application Priority Data

Mar. 25, 2014  (EP) .................................. 14161430

(51) Int. Cl.
*H02M 1/14* (2006.01)
*H02M 1/15* (2006.01)
(Continued)

(52) U.S. Cl.
CPC ............. *H02M 5/458* (2013.01); *H02M 1/12* (2013.01); *H02M 1/14* (2013.01); *H02M 1/15* (2013.01);
(Continued)

(58) Field of Classification Search
CPC ............ H02M 7/04; H02M 7/12; H02M 7/14; H02M 7/143; H02M 7/146; H02M 7/15;
(Continued)

(56) References Cited

U.S. PATENT DOCUMENTS

2005/0127853 A1 * 6/2005 Su .......................... H02M 7/487
318/108
2015/0295507 A1 * 10/2015 Barupati ............... H02M 7/487
363/35

(Continued)

FOREIGN PATENT DOCUMENTS

WO    2011050847 A1    5/2011
WO    2012163841 A1    12/2012
(Continued)

OTHER PUBLICATIONS

International Search Report and Written Opinion issued in connection with corresponding PCT application PCT/EP2015056139 dated Jul. 8, 2015.

*Primary Examiner* — Timothy J Dole
*Assistant Examiner* — Ivan Laboy Andino
(74) *Attorney, Agent, or Firm* — GE Global Patent Operation; Scott R. Stanley

(57) ABSTRACT

A voltage source converter of the controlled transition bridge type, having three phase limbs, each phase limb having a high &de director switch (Sw1 Sw3, Sw5) and a low side director switch (Sw4, Sw6, Sw2) connecting a respective DC terminal (DC+, DC−) to an AC node for that phase limb. Chain-link circuits for each phase limb comprise a plurality of series connect cells, each cell having an energy storage element that can be selectively connected in series or bypassed. The chain-link circuits are operated in a voltage mode to provide a defined voltage transition at the AC node during a transition between one director switch being turned off and the other director switch being turned on. Chain-link (Continued)

circuits are connected to a common node such that, in use, a current can flow from one phase limb to another via the respective chain-link circuits.

22 Claims, 9 Drawing Sheets

(51) Int. Cl.
   *H02M 7/219* (2006.01)
   *H02M 7/493* (2007.01)
   *H02M 7/483* (2007.01)
   *H02M 5/458* (2006.01)
   *H02M 1/12* (2006.01)
   *H02M 7/487* (2007.01)
   *H02M 1/00* (2006.01)
   *H02M 7/217* (2006.01)

(52) U.S. Cl.
   CPC ............ *H02M 7/217* (2013.01); *H02M 7/219* (2013.01); *H02M 7/483* (2013.01); *H02M 7/487* (2013.01); *H02M 7/493* (2013.01); *H02M 2001/0058* (2013.01); *H02M 2007/4835* (2013.01)

(58) Field of Classification Search
   CPC ........ H02M 7/217; H02M 7/219; H02M 7/42; H02M 7/44; H02M 7/48; H02M 7/483; H02M 7/49; H02M 7/493; H02M 7/537; H02M 7/5387; H02M 7/5388; H02M 7/539; H02M 7/53; H02M 7/95; H02M 7/757; H02M 7/7575; H02M 7/797; H02M 2001/0058; H02M 2007/4835; H02M 1/12; H02M 1/14; H02M 5/458; H02M 7/487; Y02B 70/1491
   See application file for complete search history.

(56) References Cited

U.S. PATENT DOCUMENTS

| | | | |
|---|---|---|---|
| 2015/0357931 A1* | 12/2015 | Oates | H02M 7/493 363/89 |
| 2015/0357941 A1* | 12/2015 | Oates | H02M 7/7575 363/89 |
| 2017/0005589 A1* | 1/2017 | Moreno Munoz | H02M 7/483 |
| 2017/0054358 A1* | 2/2017 | Liang | H02M 1/12 |

FOREIGN PATENT DOCUMENTS

| | | | | |
|---|---|---|---|---|
| WO | WO 2014082657 A1 * | 6/2014 | ............ | H02M 7/487 |
| WO | WO 2016029824 A1 * | 3/2016 | ............ | H02M 3/158 |

* cited by examiner

US 9,866,138 B2

VOLTAGE SOURCE CONVERTER AND CONTROL THEREOF

TECHNICAL FIELD

This application relates to a voltage source converter and to methods and apparatus for control of a voltage source converter, and especially to a voltage source converter for use in high voltage power distribution and in particular to a voltage source converter that provides a controlled transition of voltage.

BACKGROUND

HVDC (high-voltage direct current) electrical power transmission uses direct current for the transmission of electrical power. This is an alternative to alternating current electrical power transmission which is more common. There are a number of potential benefits to using HVDC electrical power transmission.

In order to use HVDC electrical power transmission, it is typically necessary to convert alternating current (AC) to direct current (DC) and back again. Historically this has involved a six pulse bridge type topology based on thyristors which is sometimes known as a line-commutated converter (LCC).

Recent developments in the power electronics field have led to an increased use of voltages-source converters (VSC) for AC-DC and DC-AC conversion. VSCs typically include multiple converter arms, each of which connects one DC terminal to one AC terminal. For a typical three phase AC input/output there are six converter arms, with the two arms connecting a given AC terminal to the high and low DC terminals respectively forming a phase limb. Each arm includes an apparatus which is termed a valve and which typically includes a plurality of sub-modules which may be switched in a desired sequence.

In one form of known VSC, often referred to as a six pulse bridge, each valve includes a set of series connected switching elements, typically insulated gate bipolar transistors (IGBTs), each IGBT connected with an antiparallel diode. The IGBTs of the valve are switched together to connect or disconnect the relevant AC and DC terminals, with the valves of a given phase limb being switched in antiphase. By using a pulse width modulated (PWM) type switching scheme for each arm, conversion between AC and DC voltage can be achieved.

In high voltage applications where a large number of series connected IGBTs are required the approach does however require complex drive circuitry to ensure that the IGBTs switch at the same time as one another and requires large passive snubber components to ensure that the high voltage across the series connected IGBTs is shared correctly. In addition the IGBTs need to switch on and off several times over each cycle of the AC voltage frequency to control the harmonic currents. These factors can lead to relatively high losses in conversion, high levels of electromagnetic interference and a complex design.

In another known type of VSC, referred to a modular multilevel converter (MMC), each valve includes a series of cells connected in series, each cell including an energy storage element, such as a capacitor, and a switch arrangement that can be controlled so as to either connect the energy storage element in series between the terminals of the cell or bypass the energy storage element. The cells are often referred to as sub-modules with a plurality of cells forming a valve module. The sub-modules of a valve are controlled to connect or bypass their respective energy storage element at different times so as to vary over the time the voltage difference across the valve. By using a relatively large number of sub-modules and timing the switching appropriately the valve can synthesise a stepped waveform that approximates to a sine wave and which contain low level of harmonic distortion. As the various sub-modules are switched individually and the changes in voltage from switching an individual sub-module are relatively small a number of the problems associated with the six pulse bridge converter are avoided.

In the MMC design the high side terminal of each valve will, at least for part of the cycle, be connected to a voltage which is substantially equal to the high DC busbar voltage, $+V_{DC}$, whilst the low side terminal is connected to a voltage which is substantially equal to the low DC busbar voltage, $-V_{DC}$. In other words each valve must be designed to withstand a voltage of $2V_{DC}$. This requires a large number of sub-modules with capacitors having relatively high capacitance values. The MMC converter may therefore require a relatively large number of components adding the cost and size of the converter.

In some applications the size or footprint of a VSC may be a particular concern. For example HVDC is increasingly being considered for use with offshore wind farms. The electrical energy generated by the wind farms may be converted to HVDC by a suitable VSC station for transmission to shore. This requires a VSC to be located on an offshore platform. The costs associated with providing a suitable offshore platform can be considerable and thus the size or footprint of VSC station can be significant factor in such applications.

Recently another form of VSC, referred to as a controlled transition bridge (CTB), has been proposed. FIG. 1 illustrates a known controlled transition bridge converter 100. This converter has six arms, each arm including a switch $S_{W1}$-$S_{W6}$. Each of the switches $S_{W1}$-$S_{W6}$, which will be referred to herein as director switches, may include a plurality of series connected switch elements (not shown). As with the six-pulse bridge described above each director switch $S_{W1}$-$S_{W6}$, which can be switched to be conducting or non conducting, connects one DC terminal, i.e. the high or low side DC terminal or busbar (DC+, DC−), to an AC node 102a-c, i.e. a node which is between the two director switches of a given phase and which represents a tap/feed point for the AC current/voltage. The converter 100 also includes a chain-link circuit 101a-c connected to a node between the two director switches forming a particular AC phase limb, ($S_{W1}$, $S_{W4}$; $S_{W3}$, $S_{W6}$ or $S_{W5}$, $S_{W2}$). In other words a first end of the chain-link circuit 101a-c is coupled to the respective AC node 102a-c. The other (second) end of each chain-link circuit is connected to ground. Each chain-link circuit includes a plurality of cells 103 connected in series. Each cell has terminals 104a, 104b for upstream and downstream connection and includes a capacitor 105 connected with four IGBTs 106 in a full H-bridge arrangement, each IGBT being connected with an antiparallel diode. DC link capacitances 107 are provided for the DC buses. Such a converter is described in WO2011/050847.

In operation, the two arms of a given phase limb may be switched between a high state, where the high side director switch, i.e. $S_{W1}$, $S_{W3}$ or $S_{W5}$, is on, i.e. conducting, and the respective low side director switch, i.e. $S_{W4}$, $S_{W6}$ or $S_{W2}$, is off, i.e. non-conducting, and a low state where the opposite is true. However, unlike in the conventional two level converter, in this converter the transition between the high and low states is controlled by the relevant chain-link circuit 101a-c. For example to transition from the high state to the low state for AC phase A, the cells of the chain-link circuit 101a are controlled to connect the capacitors in series to provide a voltage substantially equal to +$V_{DC}$ at the top of the chain-link circuit 101a (i.e. at the connection to the phase limb) whilst director switch $S_{W1}$ is turned off. This means that there is substantially no voltage drop across director switch $S_{W1}$ when it is turned off. The cells of the chain-link circuit can then be controlled to bypass the capacitors of the modules in sequence to ramp the voltage at the top of the chain-link circuit, and hence the voltage at the relevant AC node 102a, down to zero. As the cells of the chain-link circuit are based on a full bridge arrangement the capacitors can be connected to present a negative voltage at the top of the chain-link circuit. The cells of the chain-link circuit can therefore be connected in sequence to step the voltage at the top of the chain-link circuit down to −$V_{DC}$. Once the voltage at the AC node 102a is substantially down to −$V_{DC}$ the director switch $S_{W4}$ can be opened to enable to enable the low state. There is therefore a transition state between the high state and the low state (and vice versa) when the chain-link circuit is used to control the voltage transition at the AC node. It will be noted that during the transition the current for that phase may flow to ground via the chain-link circuit. Thus the DC current is interrupted and hence DC link capacitances 107 are provided to avoid excess voltage ripple on the DC terminals.

In its basic form the CTB produces a trapezoidal waveform of voltage with the chain-link circuit providing soft switching of the director switches of the six pulse bridge arrangement and with a controlled transition so that snubber circuits to provide voltage sharing during switching are not necessary. Also, as the director switches $S_{W1}$-$S_{W6}$ are switched with a low voltage difference across the switch, the requirements for the switching control of the various switching elements making up a director switch is relaxed compared with the six pulse bridge.

The CTB converter requires only three chain-link circuits, one per phase, as oppose to the MMC converter which requires a plurality of sub-modules for each arm. It will be noted that the cells 103 of the chain-link circuits 101a-c are based on a four-switch full-bridge arrangement, whereas the MMC cells may be based on a two-switch half-bridge arrangement. However it will be appreciated that the maximum voltage difference developed across a chain-link circuit during normal operation of the converter 100 is equal in magnitude to $V_{DC}$. As mentioned above for an MMC the maximum normal voltage difference across each valve would be equal to 2$V_{DC}$. This means that a controlled transition bridge converter may have a significantly lower footprint than an MMC.

The CTB type converter thus offers various advantages that would make such a converter attractive, especially for applications where size of the converter station is important. However there are some practical issues regarding implementation of such a converter.

The general control scheme results in a trapezoidal waveform at the connection point between the two converter arms of a phase limb. To allow for AC voltage magnitude control in such a scheme tap changers may be integrated into the power transformer. However this results in a problem in terms of fault handling where the AC voltages become extremely unbalanced.

Also, as mentioned above, the use of the described controlled transition bridge arrangement requires the use of DC link capacitances. In practice these DC capacitances have to be very large to prevent unacceptable voltage ripple.

Further, the voltages of the cells of the chain-link circuit converter need to be controlled in use to ensure correct operation.

BRIEF DESCRIPTION

Embodiments of the invention are therefore directed at an improved converter and methods and apparatus for the control thereof that at least mitigate at least some of the above mentioned disadvantages.

Thus according to embodiments of the present invention there is provided a voltage source converter, including a plurality of phase limbs connected between high and low DC terminals; wherein each phase limb includes a high side director switch connecting the high side DC terminal to an AC node for that phase limb; a low side director switch connecting the AC node to the low DC terminal; and a chain-link circuit, wherein a first end of the chain-link circuit is connected between the high and low director switches to be electrically coupled to the AC node. The converter further includes first and second additional chain-link circuits, wherein first ends of the first and second additional chain-link circuits are connected to the high side DC terminal and low side DC terminals respectively; and a converter controller configured to control the director switches of each phase limb in a power cycle and to control the chain-link circuits of each phase limb in a voltage mode to provide a controlled voltage transition at the AC node during the power cycle, wherein the converter controller is operable to control at least some of the chain-link circuits in a current mode to provide a defined current at times during the power cycle. Each chain-link circuit includes a plurality of series-connected chain-link modules, each of the chain-link modules including at least one energy storage element that can be selectively connected in series with the other modules or bypassed. Additionally, a second end of each of the chain-link circuits is connected to a common node such that, in use, a current can flow from one phase limb to another via the respective chain-link circuits.

In some embodiments the converter controller is configured to control the chain-link circuit of each phase limb in a voltage mode to provide a defined voltage transition at the AC node during a transition state between one director switch being turned off and the other director switch being turned on; and operate the chain-link circuit of a phase limb in current mode for at least part of the time when that phase limb is not in a transition state. The converter controller may control the director switches of each phase limb to cycle between a sequence of phase states including a high state in which the high side director switch is on and the low side director switch is off; a low state in which the low side director switch is on and the high side director switch is off; and a transition state between one of the director switches being turned off and the other director switch being turned on.

In embodiments of the present invention the chain-link circuits of the phase-limbs are connected to one another in such a way that a current can flow from one phase limb to another via the chain-link circuits, i.e. the chain-link circuits are not connected to ground or some other current sink. The chain-link circuits, i.e. the chain-link circuits of the phase limbs and the first and second additional chain-link circuits, may be operated in a current mode during operation. The chain-link circuits of the phase limbs may be operated in current mode when not being used to control a voltage transition in order to provide a defined current. This can allow the required currents to circulate between phases of the converter without requiring large DC link capacitances and/or can provide a means for balancing the energy storage devices, e.g. capacitors, of the chain link circuits.

The converter also includes additional chain-link circuits connected between the DC terminals and the common connection point of the chain-link circuits of the phase limbs. The additional chain-link circuits can be used as a switched current source to provide a path for DC current in the event that no current path exists via the phase limbs. Such a converter can therefore be operated such that, for at least part of each power cycle, two phase limbs are in transition and the third phase limb has one of the high or low side director switches on. This mode of operation may provide benefits with respect to distortion and reduce the amount of any filtering required. During a state where all of the director switches connected to a DC terminal are off, the relevant additional chain-link circuit can provide a current path for the DC current and maintain correct current circulation within the converter, thus reducing or eliminating the need for large DC link capacitances. The additional chain-link circuits also help with fault ride through.

The converter controller may be configured to determine the defined current flow for each chain-link circuit operating in current mode based on an indication of AC and DC current demand and the switch states of each of the phase limbs of the converter.

In some embodiments the converter has three phase limbs and is operable in use in a repeating sequence of converter switch states including a first plurality of converter states in which one phase is in the high state; one phase limb is in the low state; and one phase limb is in the transition state. When the converter is in one of the first plurality of converter states the converter controller may operate the chain-link circuit of the phase limb in the high state to provide a defined chain-link current having a component based on the DC current demand minus the AC current demand for that phase and/or may operate the chain-link circuit of the phase limb in the low state to provide a defined chain-link current having a component based on the DC current demand minus the AC current demand for that phase.

In some embodiments the converter may additionally or alternatively be operable in use in a sequence of converter switch states including a second plurality of converter states in which two phase limbs are in the same one of the high state or the low state; and the other phase limb is in the other of high state or the low state. In this case the converter controller may operate one of the chain-link circuits of the two phase limbs which are in the same state to provide a defined chain-link current having a component based on a first fraction of the DC current demand minus the AC current demand for that phase, and operate the other of the chain-link circuits of the two phase limbs which are in the same state to provide a defined chain-link current having a component based on a second fraction of the DC current demand minus the AC current demand for that phase; wherein the first and second fractions together equal a value of substantially one. The first and second fractions may each be a half. The converter controller may operate the chain-link circuit of the phase limb in the other state to provide a defined chain-link current having a component based on the DC current demand minus the AC current demand for that phase.

In some embodiments the converter may additionally or alternatively be operable in use in a sequence of converter switch states including a third plurality of converter states in which two phase limbs are in the transition state; and the other phase limb is in one of high state or the low state. In such a case the converter controller may operate the chain-link circuits of the phase limb in the high state or low state to provide a defined chain-link current having a component based on the DC current demand minus the AC current demand for that phase.

The converter controller may be configured, in use, to operate the first additional chain-link circuit to provide a defined current for at least part of the time when the converter is in one of the third plurality of converter states and one phase limb is in the low state and/or to operate the second additional chain-link circuit to provide a defined current for at least part of the time when the converter is in one of the third plurality of converter states and one phase limb is in the high state.

The defined current of the first additional chain-link circuit or second additional chain-link circuit may be controlled to have a component based on the DC current demand.

In some embodiments the converter controller may include a current mode controller for controlling each chain-link circuit when operating in current mode, wherein the current mode controller includes a deadbeat controller. The converter controller may include a phase controller for controlling the phase state of each of the phase limbs. The converter controller may include a current distribution controller for determining the defined current for each chain-link circuit operating in current mode, wherein the current distribution controller is responsive to a phase state control signal from each of the phase controllers indicating the phase state of the respective phase limb. The current distribution controller may include at least one look-up table for determining the defined current for each chain-link circuit based on the phase state control signals.

The converter controller may be configured to control each phase limb to generate a trapezoidal voltage waveform at the AC node. In some embodiments the duration of the voltage transition from the midpoint voltage to the voltage of the high DC terminal or the low DC terminal may correspond to a difference in phase angle of greater than $\pi/6$. In some embodiments the trapezoidal voltage waveform may have at least two different slopes during the transition.

The energy storage elements of the chain-link modules may include capacitors. In which case the converter controller may include a capacitor balancing controller for maintaining the voltage of the capacitors within predefined limits.

The converter controller may be configured to control the chain-link circuits such that, in each a plurality of converter switch states, a compensation current flows between the high and low DC terminals via at least two chain-link circuits such that the sum of the compensation current flowing through each chain-link circuit over the switching cycle of the converter maintains the voltage of the capacitors within predefined limits.

The capacitor balancing controller may be configured to determine a value for a compensation current required to maintain the voltage of the capacitors within predefined limits and the defined current of a chain-link circuit operating in current mode may include a component based on the compensation current value. The converter controller may be configured to adjust the DC current demand of the converter based on the compensation current value. The capacitor balancing controller may be configured to determine a compensation current requirement for each chain-link circuit and determine the compensation current value based on the switch states of each of the phase limbs of the converter.

In some embodiments the converter has three phase limbs and is operable in use in a switch state in which: two chain-link circuits are operating in current mode; and one phase limb is operating in voltage mode. When the converter is operating in such a switch state the compensation current value may be based on the compensation current requirement for the chain-link circuits operating in current mode added together minus the compensation current requirement for the chain-link circuit operating in voltage mode.

In some embodiments the converter is operable in use in a switch state in which: all three chain-link circuits are operating in current mode, with two phase limbs in the same state and the other phase limb in the opposite state. When the converter is operating in such a switch state the compensation current value may be based on three times the compensation current requirement for the chain-link circuit of the phase in the opposite state minus the compensation current requirement for each of the two other phases.

In some embodiments the converter is operable in use in a switch state in which: only one chain-link circuit of the phase limb is operating in current mode. When the converter is operating in such a switch state the compensation current value may be based on the compensation current requirement for that chain-link circuit.

The capacitor balancing controller may be configured to monitor the voltages of the capacitors of the chain-link circuits and compare the determined voltages with a reference value to determine an error value, wherein the compensation current requirement is based on the error signal. The capacitor balancing controller may be configured to receive an indication of measured capacitor values or estimate any voltage change of the capacitors based on the voltage across the chain-link circuit and an indication of chain-link current.

The director switches of a phase limb each include a plurality of series connected switch elements. In some embodiments the director switches of a phase limb include thyristors.

In some embodiments the converter includes DC link capacitances connected to the high and low DC terminals, wherein the DC link capacitances might typically have a capacitance value in the range 4 mF to 10 mF.

The voltages source converter may be used in a high voltage direct current power distribution system.

In another aspect of the invention there is provided a method of operating a voltage source converter. Thus in another aspect of the invention there is provided a method of operating a voltage source converter, the voltage source converter having a plurality of phase limbs connected between high and low DC terminals. Each phase limb includes a high side director switch connecting the high side DC terminal to an AC node for that phase limb; a low side director switch connecting the AC node to the low DC terminal; and a chain-link circuit comprising a plurality of series-connected chain-link modules. A first end of the chain-link circuit is connected between the high and low director switches to be electrically coupled to the AC node; and each of the chain-link modules includes at least one energy storage element that can be selectively connected in series with the other modules or bypassed, first and second additional chain-link circuits, where first ends of the first and second additional chain-link circuits are connected to the high side DC terminal and low side DC terminals respectively. Each of the chain-link circuits include at least one energy storage element that can be selectively connected in series with the other modules or bypassed, and a second end of each of the chain-link circuits is connected to a common node such that, in use, a current can flow from one phase limb to another via the respective chain-link circuits. The method includes controlling the director switches in a power cycle and controlling the chain-link circuits of each phase limb in a voltage mode to provide a controlled voltage transition at the AC node during the power cycle; and operating at least one of the chain-link circuits in a current mode to provide a defined chain-link current at times during the power cycle.

The method may offer advantages and can be implemented in all of the variants described above in respect to the first aspect of the invention.

In another aspect there is provided a voltage source converter, including a plurality of phase limbs connected between high and low DC terminals; wherein each phase limb includes a high side director switch connecting the high side DC terminal to an AC node for that phase limb; a low side director switch connecting the AC node to the low DC terminal; and a chain-link circuit, comprising a plurality of series-connected chain-link modules, each of the chain-link modules comprising at least one energy storage element that can be selectively connected in series with the other modules or bypassed, a first end of the chain-link circuit being connected between the high side and low side director switches to be electrically coupled to the AC node A second end of each of the chain-link circuits is connected to a common node such that, in use, a current can flow from one phase limb to another via the respective chain-link circuits. A converter controller is configured to control the director switches of each phase limb to cycle between a sequence of phase states; and further configured to control the chain-link circuit of each phase limb in a voltage mode to provide a defined voltage transition at the AC node during a transition state between one director switch being turned off and the other director switch being turned on. Furthermore, the converter controller is configured to operate the chain-link circuit of a phase limb in a current mode to provide a defined chain-link current for at least part of the time when that phase limb is not in a transition state.

In embodiments of this aspect of the present invention therefore the chain-link circuits of the phase-limbs are again connected to one another in such a way that a current can flow from one phase limb to another via the chain-link circuits, i.e. the chain-link circuits are not connected to ground or some other current sink and the chain-link circuits of a phase limb not being used in voltage mode is used in a current mode to allow a defined current to flow.

The converter according to this aspect of the invention may be used in all of the same variants as described above with respect to the first aspect of the invention.

Embodiments of the invention also related to methods and apparatus for operating a controlled transition bridge type converter to provide capacitor balancing where the energy storage elements of the chain-links are capacitors. Thus in another aspect there is provided a voltage source converter, which includes a plurality of phase limbs connected between high and low DC terminals. Each phase limb includes a high side director switch connecting the high side DC terminal to an AC node for that phase limb; a low side switch connecting the AC node to the low DC terminal; and a chain-link circuit connected to the AC node and operable to control a voltage transition at the AC node when both the high side and low side director switches are off. Each chain-link circuit includes a plurality of series-connected chain-link modules, and each of the chain-link modules includes at least one capacitor that can be selectively connected in series with the other modules or bypassed. A converter controller is provided and configured to control the chain-link circuits such that, in each a plurality of converter switch states, a compensation current flows between the high and low DC terminals via at least two chain-link circuits wherein the sum of the compensation current flowing through each chain-link circuit over the switching cycle of the converter maintains the voltage of the capacitors within predefined limits.

The converter controller may monitor the voltages of the capacitors of the chain-link circuits and to operate the chain-link circuit of a phase limb in a current mode for at least part of the time when the chain-link circuit is not controlling a voltage transition to provide a chain-link current for maintaining the voltages of the capacitors of the chain-link circuit within pre-determined limits. The converter may additionally comprise first and second additional chain-link circuits, where first ends of the first and second additional chain-link circuits are connected to the high side DC terminal and low side DC terminals respectively. The first and second additional chain-link circuits can be used to provide a flow path for the compensation current in a state where all of the high side or all of the low side directors switches are off.

The converter controller therefore determines whether any capacitor balancing is required and if so controls the chain-link circuit when not being used to control a voltage transition so as to provide a resetting or compensation current which will maintain the capacitor voltages within predetermined limits. The converter controller may comprise a capacitor balancing controller as described above. The converter may be implemented in any of the variants describe above.

BRIEF DESCRIPTION OF THE DRAWINGS

Embodiments of the present invention will now be described by way of example only with respect to the following drawings, of which.

DETAILED DESCRIPTION

As discussed above FIG. 1 illustrates a known type of converter referred to as a controlled transition bridge (CTB). The converter is operable in a high state in which the high side director switch is on, i.e. conducting, and the low side director switch is off, i.e. non-conducting, and also in a low state in which the low side director switch is on and the high side director switch is off. The chain-link circuits 101a-c control the voltage transition at the AC nodes 102a-c of the converter in a transition state between one of the director switches being turned off and the other director switch being turned on. In the conventional approach the converter is controlled to generate a trapezoidal waveform such as illustrated in FIG. 2.

Figure 2:
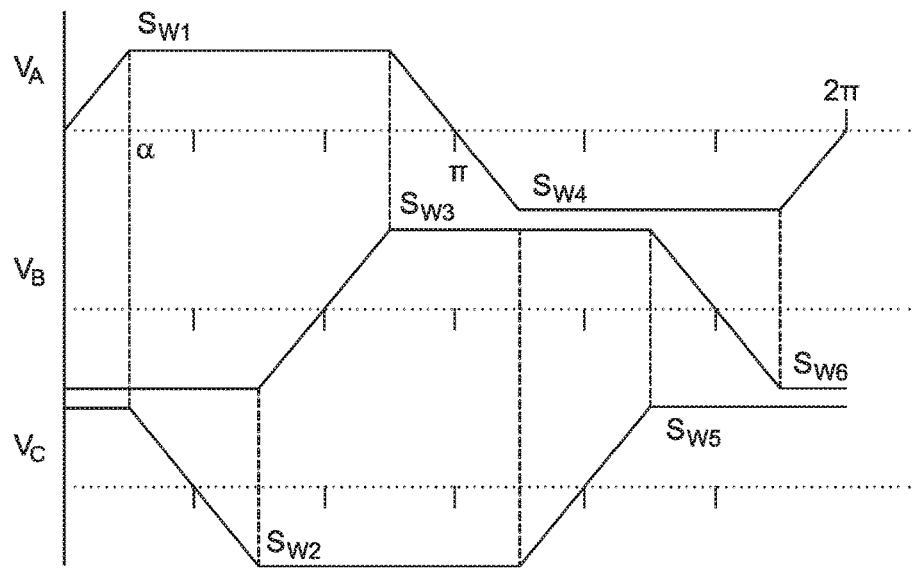
FIG. 2 illustrates a trapezoidal waveform driving scheme for a converter such as shown in FIG. 1.

FIG. 2 illustrates how the voltages of the three phases at the nodes 102a-c may be controlled over a phase cycle of $2\pi$. Considering initially just phase A and the voltage VA illustrated in the top plot, at the start of the cycle the voltage at node 102a is zero. The chain-link circuit 101a is controlled to provide a steady voltage ramp up to the high side voltage at a phase angle $\alpha$. At this time director switch $S_{W1}$ is then turned on. Director switch $S_{W1}$ remains on until a phase angle $\pi-\alpha$ in the cycle and then is turned off whilst chain-link circuit 101a maintains a high voltage at node 102a. The chain-link circuit 102a is then controlled to ramp the voltage at node 102a down to zero (at a phase angle $\pi$) and then down further to the low side voltage (at a phase angle $\pi+\alpha$). Director switch $S_{W4}$ is then turned on and remains on for a certain duration (until phase angle $2\pi-\alpha$) before being turned off. The voltage at node 102a is then ramped back to zero for the end of the cycle. The voltages $V_B$ for phase B and $V_C$ for phase C follow similar cycles but with phase delays of $2\pi/3$ and $4\pi/3$ respectively.

Figure 1:
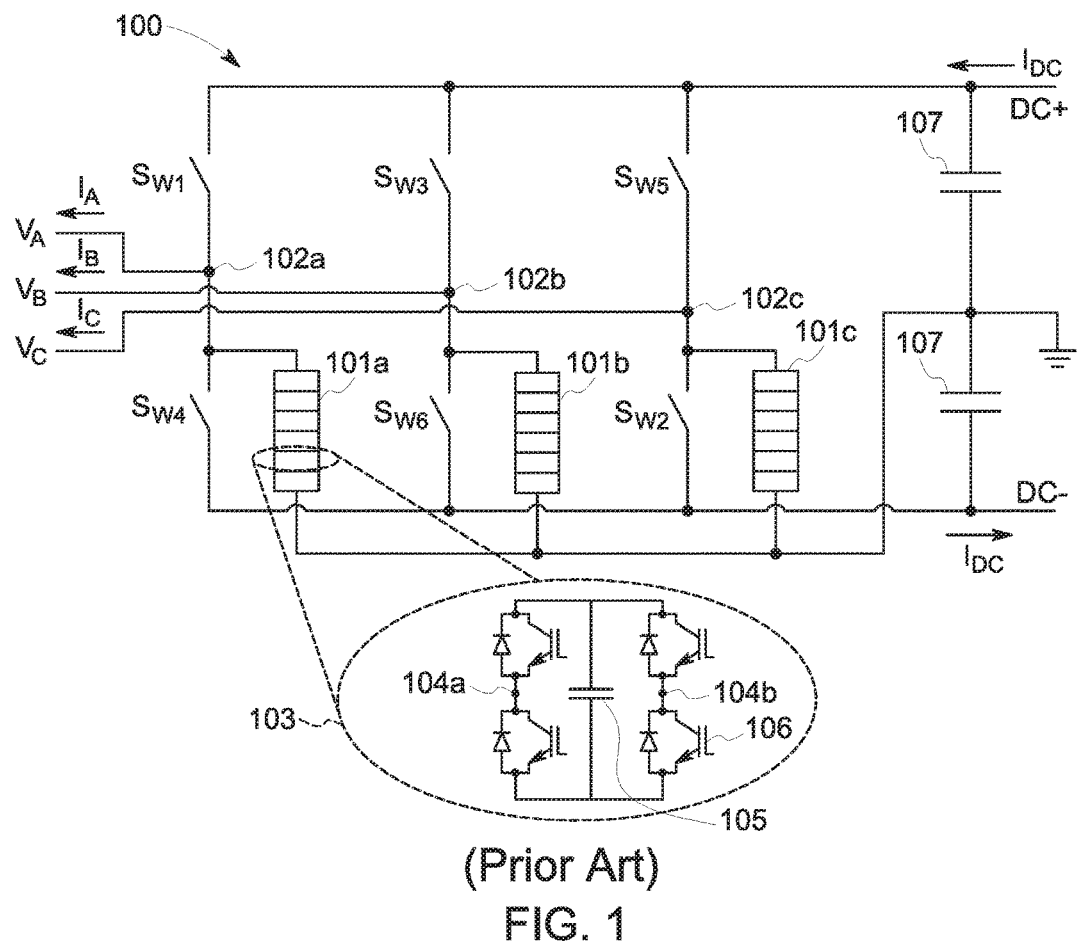
FIG. 1 illustrates a known voltage source converter of the controlled transition type.

As previously mentioned, for the converter shown in FIG. 1 the DC current flow for a phase is interrupted during the transition and thus the large link capacitances 107 are required to maintain the voltage at the DC terminals, which may be undesirable and even impractical in some instances.

In embodiments of the present invention a controlled transition bridge type converter is provided where chain-link circuits are provided to control the voltage transition at each AC node. Embodiments therefore have a chain-link circuit associated with each phase with a first end of the chain-link circuit connected to a midpoint of the relevant phase, i.e. coupled to the relevant AC node between the high side and low side director switches. The second ends of these chain-link circuit are all connected to one another, i.e. to a common node, but this common connection is not connected to ground, or some other current sink, as with the conventional CTB. In embodiments of the present invention therefore a current can flow from one phase limb to another via the respective chain-link circuits.

Figure 3:
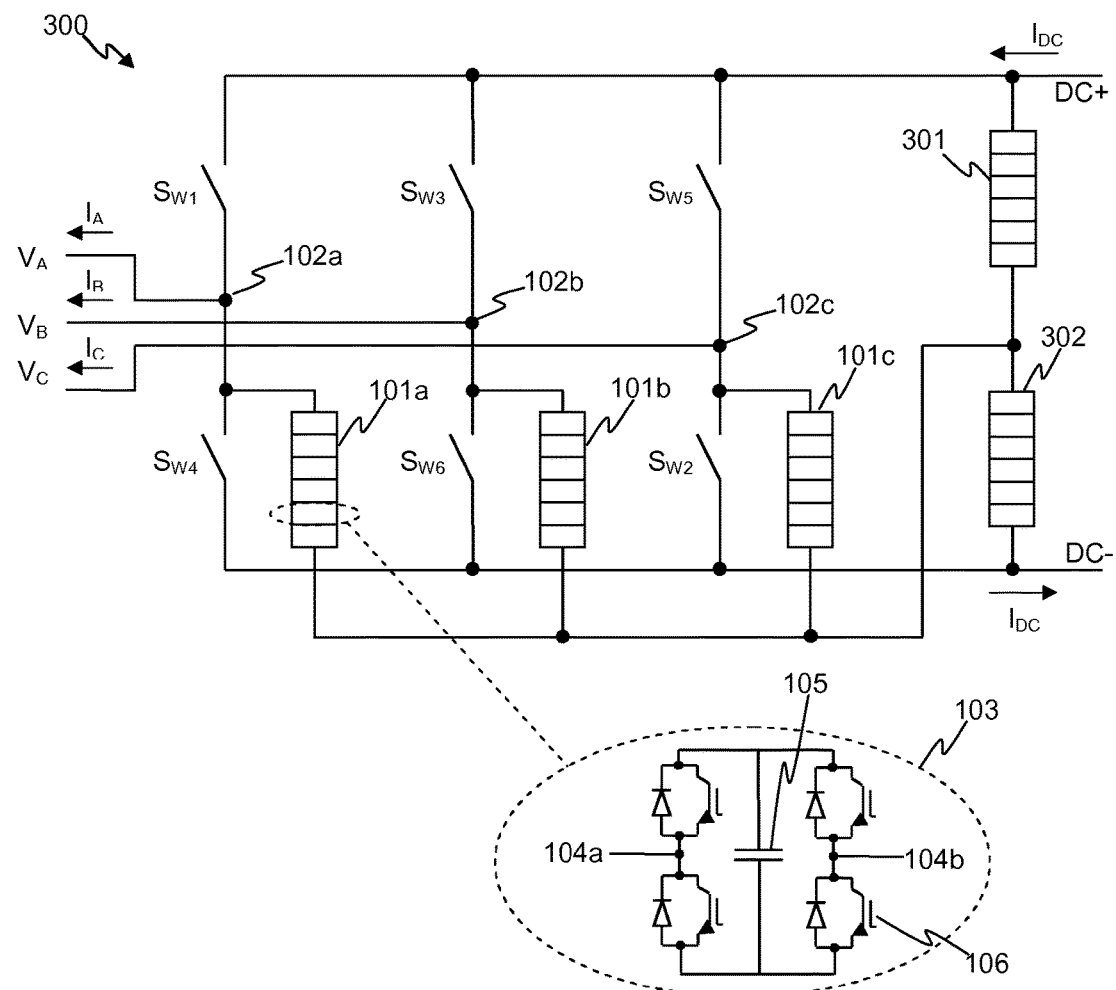
FIG. 3 illustrates a voltage source converter according to an embodiment of the invention.

FIG. 3 illustrates a converter 300 according to one embodiment of the invention in which similar components to those illustrated in the FIG. 1 are identified using the same reference numerals. In this converter 300 the chain-link circuits 101*a-c* are connected to one another but not connected to ground. In this embodiment additional chain-link circuits 301 and 302 are also provided between each of the DC terminals, DC+ and DC−, and the common connection of the chain-links circuits 101*a-c*.

Embodiments of the invention, such as the embodiment illustrated in FIG. 3, use current mapping techniques to maintain a smooth DC current at the DC terminals and thus allow any DC link capacitances (not shown in FIG. 3) to be much smaller than with the known CTB converter or even eliminated altogether. In these embodiments the chain-link circuits 101*a-c* are operated in a voltage mode in the transition state to control transition of the voltage at the AC nodes 102*a-c* between the high and low states as described previously but may also be operated in a current mode, whilst not being used to control the voltage transition to provide a defined chain-link current in order to ensure correct current circulation. In other words for at least part of the time that a phase limb is not in a transition state, and is in the high state and/or the low state, the chain-link circuit for that phase may be operated in current mode to provide a defined chain-link current.

A chain-link circuit 102*a-c* is thus operated in the voltage mode to control a voltage transition when both director switches for that phase limb are off, i.e. non-conducting. Any current flow for that phase will therefore be via the relevant chain-link circuit. Rather than have such current flow to ground however at least one of the other chain-link circuits may be operated in a current mode to provide a defined current flow through that chain-link circuit and hence the control the overall current circulation for the various phases. As will be described in more detail below a converter controller may be configured to determine the defined current flow for each chain-link circuit operating in current mode based on an indication of AC and DC current demand and the switch states of each of the phase limbs of the converter.

Figure 4:
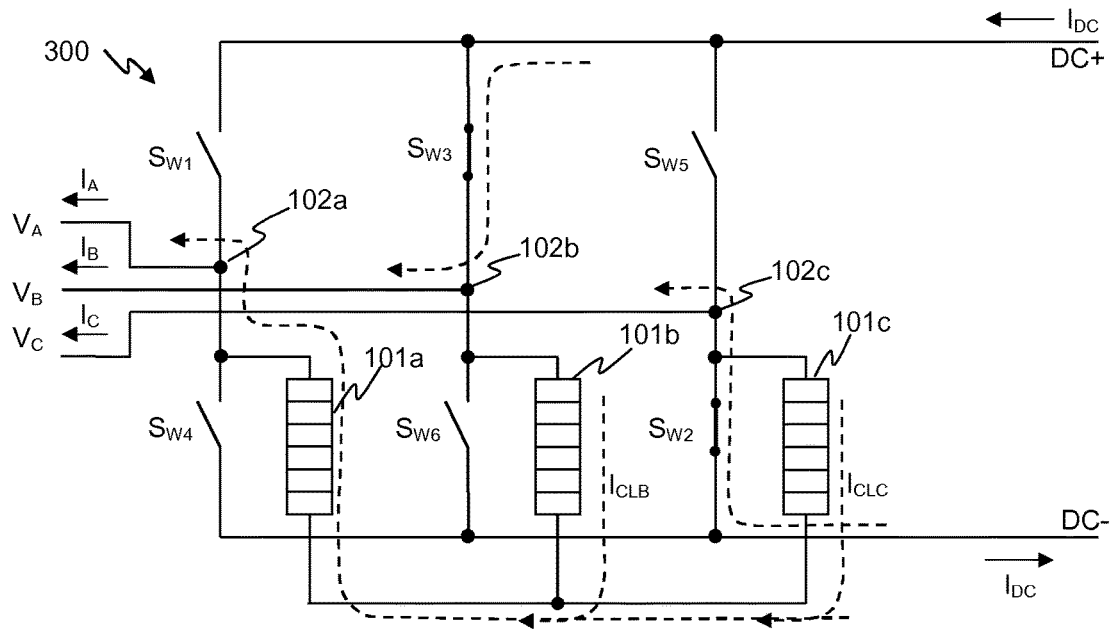
FIG. 4 illustrates current flow in one switch state of the converter of FIG. 3.

As an example consider a particular switch state of the converter, say the converter switch state where phase B is in the high state with director switch $S_{W3}$ on; phase C is in the low state with director switch $S_{W2}$ on; and phase A is transitioning between the high and low states. In the example waveform shown in FIG. 2 this switch state occurs between phase angles of $\pi-\alpha$ and $\pi+\alpha$. In this state chain-link circuit 101*a* is operating in voltage mode to control the voltage at node 102*a*. Director switch $S_{W3}$ is on to provide a current path for current $I_B$ and director switch $S_{W2}$ on to provide a current path for current $I_C$. FIG. 4 illustrates this switch state and the dotted lines illustrate the various current paths in the relevant part of the converter. It will be assumed that the terminal currents will be inductively driven so transient variations in voltages at the terminals will have minimal effect, the consequence of this being also that there must be an ensured path for all of the terminal currents at all times. In this embodiment the chain-link circuits 101*b* and 101*c* are operable in a current mode to allow currents $I_{CLB}$ and $I_{CLC}$ to circulate in phases B and C respectively.

For correct operation currents of $I_B$ and $I_C$ (the AC current demand for these phases) should flow in phases B and C respectively whilst currents of $I_{DC}$ and $-I_{DC}$ (the DC current demand) should flow in the positive and negative DC rails respectively. To provide currents of $I_B$ and $I_C$ to phases B and C respectively, the currents generated by the chain-link circuits 101*b* and 101*c* should be equal to:

$$I_{CLB} = I_{DC} - I_B$$

$$I_{CLC} = -I_{DC} - I_C \qquad \text{Eqn. (1)}$$

The chain-link circuits may be controlled in current mode using a form of dead-beat control as will be described in more detail below. As one skilled in the art will appreciate in a dead-beat control the instantaneous current is tracked with respect to an appropriately defined reference current.

The common point of connection for chain-link circuits 101*a-c* is not connected to ground and thus these difference currents generated by the chain-link circuits are forced to flow into phase A as illustrated. The current for phase A is thus:

$$I_A = I_{CLB} + I_{CLC} = (I_{DC} - I_B) + (-I_D - I_C) = -I_B - I_C \qquad \text{Eqn. (2)}$$

As it is the case that $i_A + i_B + i_C = 0$ by definition, this current condition is valid and provides for a smooth DC current with the need for little or no DC link filtering.

Similar considerations apply to all converter switch states where one phase limb is in the high state, one phase limb is in the low state and one phase limb is in the transition state with its chain-link circuit operating in voltage mode to control the voltage at the relevant AC node. In such a state in general the chain-link circuit of the phase limb in the high state may be operated to provide a defined chain-link current having a component based on the DC current demand minus the AC current demand for that phase and the chain-link circuit of the phase limb in the low state may be controlled to provide a defined chain-link current having a component based on the DC current demand minus the AC current demand for that phase.

It is noted however that other switch states may exists, depending on the value of $\alpha$. FIG. 2 illustrates a trapezoidal waveform where the value of $\alpha$ is exactly equal to $\pi/6$, which is a special value of $\alpha$. As explained above $\alpha$ can be seen as the difference in phase angle between the voltage at a relevant AC node being at zero and the intercept with the relevant DC bus voltage at which point the relevant director switch is turned on. For a symmetric waveform $\alpha$ is also the difference in phase angle between the point in the cycle at which a director switch is turned off and the intercept of the voltage at the AC terminal with zero. Thus director switch $S_{W1}$ is turned on at a phase angle of a and turned off at a phase angle of $\pi-\alpha$. Director switch $S_{W3}$ is controlled with a relative $2\pi/3$ delay so is turned on at a phase angle of $2\pi/3+\alpha$. If the value of $\alpha$ is equal to $\pi/6$ then director switch $S_{W1}$ is turned off at the exact time that director switch $S_{W3}$ is turned on. Likewise as illustrated in FIG. 2 director switch $S_{W3}$ is turned off as director switch $S_{W5}$ is turned on and director switch $S_{W5}$ is turned off as director switch $S_{W1}$ is turned on. Thus there is always one, but only one high side director switch conducting at any time. A similar relationship exists for the low side director switches and there is always one, but only one, low side director switch conducting (ignoring any propagation delays or slight timing errors associated with turn on of the director switches).

For this special case therefore the converter switches between a first plurality of converter switch states which comprises six different switch states each of which has one high director switch on, one low side director switch on and one phase with both director switches off and the relevant chain-link circuit operating in voltage mode. For each of these states the current mapping techniques described may be used so that the chain-link circuits for the phases in the high state and low state are operated in current mode to provide correct current circulation.

It will be appreciated however that other values for the intercept angle value $\alpha$ would lead to other switch states. For instance if a were to have a value less than $\pi/6$ then the controlled voltage transition for one phase will finish with two director switches in each of the other two phases continuing to conduct, so for a short period all three phases will have director switches conducting. For example director switch $S_{W3}$ would turn on before director switch $S_{W1}$ turns off and thus there would be a state with two high side director switches on at the same time. This short period at the end of the transition will thus have two director switches to one DC rail and a third director switch conducting to the opposite DC rail.

Were however α to have a value greater than π/6 then the director switch $S_{W1}$ would be turned off to start the voltage transition for phase A whilst the voltage transition for phase B was still occurring and thus before director switch $S_{W3}$ is turned on. In this case therefore there will be a period where all three high (or low) side director switches are off.

It should be noted that the converter could be arranged to provide waveforms other than trapezoidal waveforms. However the use of a trapezoid waveform has the advantage that the fundamental rises above the DC link, reducing the AC current for a given power rating and so improving, i.e. reducing, the converter losses.

Figure 5:
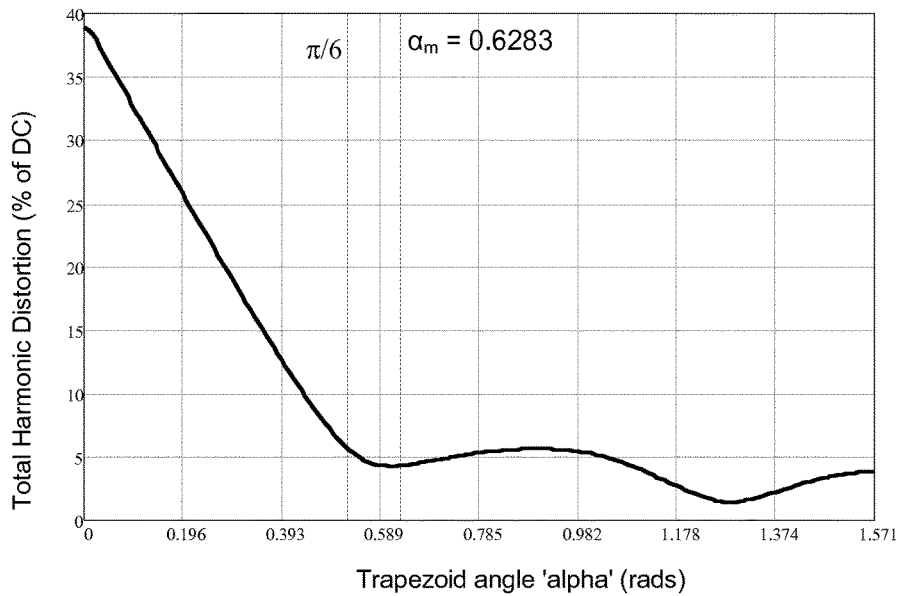
FIG. 5 illustrates how total harmonic distortion varies with intercept angle at for a trapezoidal waveform.

In use the converter will typically be implemented with a star/delta transformer connecting the AC and DC sides of the converter. This typically means that all the "Triple N" harmonics will be cancelled. In such a case the remaining harmonic content of the waveform can reduced significantly with increasing slope of the trapezoid, i.e. increasing values of α. FIG. 5 illustrates how the total harmonic distortion (THD) for a CTB type converter varies, whilst using a symmetrical trapezoidal waveform, for varying values of α. Marked on this plot is a line corresponding to α=π/6. Also marked is a line corresponding to a value $α_m$ which corresponds to a (local) minimum of the THD curve. The value $α_m$ is 0.6283 and this point is almost precisely where the fifth harmonic crosses zero. At values of α lower than $α_m$ the THD rises rapidly. Thus there may be advantages in operating the converter with a trapezoidal waveform with a value of α at or around $α_m$, i.e. at a value of α greater than π/6. It will be seen from FIG. 5 that there may be another lower minimum of THD at even higher values of α, however the greater the value of α the less time the converter spends in the high or low state with the relatively low loss director switches conducting. For these reasons operation around $α_m$ could be a preferred operating regime in some embodiments.

Table 1 below lists the various switch states that the converter could be validly switched to by varying the switching sequence, i.e. the value of α, accordingly. It will be noted that some switching combinations for the six director switches that would be possible in theory are not valid switch states for operation of the VSC. For example both director switches of a given phase limb being conducting at the same time is not a valid switch state. It is also not valid (for the present discussion) to have all three high side director switches ($S_{W1}$, $S_{W3}$ and $S_{W5}$) or all three low side director switches ($S_{W1}$, $S_{W3}$ and $S_{W5}$) conducting at the same time. All director switches being non-conducting at the same time, i.e. all off together, is also not a valid switch state that occurs during a switching sequence in operation.

TABLE 1

| State | SW1 | SW4 | SW3 | SW6 | SW5 | SW2 | 101a | 101b | 101c | 301 | 302 |
|---|---|---|---|---|---|---|---|---|---|---|---|
| 1 | 0 | 0 | 0 | 0 | 0 | 1 | V | V | I | I | 0 |
| 2 | 0 | 0 | 0 | 0 | 1 | 0 | V | V | I | 0 | I |
| 3 | 0 | 0 | 0 | 1 | 0 | 0 | V | I | V | I | 0 |
| 4 | 0 | 0 | 0 | 1 | 0 | 1 | V | I | I | 0 | 0 |
| 5 | 0 | 0 | 0 | 1 | 1 | 0 | V | I | I | 0 | 0 |
| 6 | 0 | 0 | 1 | 0 | 0 | 0 | V | I | V | 0 | I |
| 7 | 0 | 0 | 1 | 0 | 0 | 1 | V | I | I | 0 | 0 |
| 8 | 0 | 0 | 1 | 0 | 1 | 0 | V | I | I | 0 | 0 |
| 9 | 0 | 1 | 0 | 0 | 0 | 0 | I | V | V | I | 0 |
| 10 | 0 | 1 | 0 | 0 | 0 | 1 | I | V | I | 0 | 0 |
| 11 | 0 | 1 | 0 | 0 | 1 | 0 | I | V | I | 0 | 0 |
| 12 | 0 | 1 | 0 | 1 | 0 | 0 | I | I | V | 0 | 0 |
| 13 | 0 | 1 | 0 | 1 | 1 | 0 | I | I | I | 0 | 0 |
| 14 | 0 | 1 | 1 | 0 | 0 | 0 | I | I | V | 0 | 0 |
| 15 | 0 | 1 | 1 | 0 | 0 | 1 | I | I | I | 0 | 0 |
| 16 | 0 | 1 | 1 | 0 | 1 | 0 | I | I | I | 0 | 0 |
| 17 | 1 | 0 | 0 | 0 | 0 | 0 | I | V | V | 0 | I |
| 18 | 1 | 0 | 0 | 0 | 0 | 1 | I | V | I | 0 | 0 |
| 19 | 1 | 0 | 0 | 0 | 1 | 0 | I | V | I | 0 | 0 |
| 20 | 1 | 0 | 0 | 1 | 0 | 0 | I | I | V | 0 | 0 |
| 21 | 1 | 0 | 0 | 1 | 0 | 1 | I | I | I | 0 | 0 |
| 22 | 1 | 0 | 0 | 1 | 1 | 0 | I | I | I | 0 | 0 |
| 23 | 1 | 0 | 1 | 0 | 0 | 0 | I | I | V | 0 | 0 |
| 24 | 1 | 0 | 1 | 0 | 0 | 1 | I | I | I | 0 | 0 |

Table 1 illustrates which director switches are conducting (value 1) or non-conducting (value 0) and whether the chain-links circuits 101a-c are operated in a current mode or a voltage mode.

It will be appreciated that in operation the converter will cycle through a sequence of a subset of these valid switch states depending on the value of the intercept angle α.

For example if the value of α is equal to π/6 the converter will cycle through a sequence comprising repeating states 5, 20, 18, 7, 14 and 11. These switch states will also occur for other values of α, but in combination with additional switch states. These six states can thus be considered base states.

If the value of α is less than π/6 the converter will cycle through a sequence comprising the base states with additional states in the sequence 5, 22, 20, 21, 18, 24, 7, 15, 14, 16, 11 and 13.

If the value of α is greater than π/6 the converter will cycle through a sequence comprising the base states with additional states in the sequence 5, 3, 20, 17, 18, 1, 7, 6, 14, 9, 11 and 2.

It will be noted that states 4, 8, 10, 12, 19 and 23 from Table 1 are states that are not used in normal operation of the converter operating with a trapezoidal waveform. For some converter embodiments these theoretically valid states may therefore be disregarded and may not occur in practice. However it is possible that in some converter embodiments such states could be used in certain operating conditions such as where the AC or DC circuits are faulted and have collapsed to some degree and they are listed here for completeness.

As mentioned above therefore for values of α of less than π/6 there will be states in the sequence where two high side or low side director switches will be conducting for two phases and the other phase will have the opposite director phase conducting. For example consider state 15 from Table 1 above. In the sequence noted above for α<π/6 state 15 follows from state 7—which is the state illustrated in FIG. 4. In state 15 however director switch $S_{W4}$ is now conducting simultaneously with director switches $S_{W3}$ and $S_{W2}$ also conducting. In this state none of the chain-link circuits 101a-c are operating in voltage mode and all three chain-link circuits can be operated in a current mode to control desired difference currents.

As illustrated in FIG. 4 in state 7 chain-links 101b and 101c are operating in current mode and chain-link 101a is operating in voltage mode to control the voltage transition at node 102a. When the voltage at node reaches substantially the low side DC rail voltage director switch $S_{W4}$ can be closed and state 15 is entered. At this time chain-link circuit 101a can start operating in current mode. As there are now two director switches closed for the negative DC rail the current $-I_{DC}$ can flow into both phases A and C with $+I_{DC}$ continuing to flow in phase B. The current $-I_{DC}$ can thus be split between phase A and phase C, with each of chain-links 101a-c being controlled to generate a respective difference current as required. It will be noted however that since all the arms in the converter have inductance each transient change in the converter operation will create a transient voltage or current which should be minimised. As an alternative approach therefore the current through the director switch $S_{W4}$ in phase A could be nulled with the current through chain-link 101a being controlled to supply $I_A$. This latter method creates the minimum number of transients but will also increase the overall losses and so the former approach may be preferred. The current $I_{DC}$ may be split between chain-link circuits 101a and 101c as first and second fractions of $I_{DC}$ where the first and second fractions sum to substantially a value of one. In this example the first and second fractions are each ½ although other fractions could be used as desired.

Assuming the former approach is adopted the respective currents controlled by the chain-links may be:

$$I_{CLA} = \frac{-I_{DC}}{2} - I_A \quad \text{Eqn. (3)}$$

$$I_{CLB} = I_{DC} - I_B$$

$$I_{LCC} = \frac{-I_{DC}}{2} - I_C$$

In general therefore the chain-link circuits of the two phase limbs which are in the same state as one another are operated to provide a defined chain-link current having a component based on a fraction, e.g. a half, of the DC current demand minus the AC current demand for that phase and operates the chain-link circuit of the other phase limb to provide a defined chain-link current having a component based on the DC current demand minus the AC current demand for that phase.

For values of α of greater than π/6 there will be states in the sequence where no high side or low side director switches will be conducting. This means that there is no current path for the DC current in either the upper or lower DC rail. For example consider state 6 from Table 1 above. In the sequence noted above for α>π/6 state 6 follows from state 7—which is the state illustrated in FIG. 4. In this state all of director switches $S_{W2}$, $S_{W4}$ and $S_{W6}$ are open and non-conducting so there is no current path to the DC–terminal/busbar. As noted previously it is assumed that the currents are being driven by inductances either within or external to the converter, so a path for all terminal currents is essential. One solution could be to add capacitors between the DC rails and the common terminal for the chain-link circuits as with the known CTB type converter, but as mentioned to prevent significant transient voltages occurring on the DC rails these capacitances may be impractically large.

In embodiments of the present invention therefore additional elements operable as switchable current sources, in this example additional chain-link circuits, may be provided between each of the DC terminals, DC+ and DC−, and the common connection of the chain-links circuits 101a-c. Referring back to FIG. 3 additional chain-link circuits 301 and 302 are therefore provided to enable current mapping in the scenario where the intercept angle α is greater than π/6.

The additional chain-link circuits 301, 302 will behave as an "active capacitor" and when operated in current mode should give a rapid pick up of current to ensure $I_{DC}$ is not interrupted. It will be noted that unlike the MMC type of converter described in the introduction the purpose of these additional chain-link circuits 301 and 302 connected between the DC terminals is to provide a current path for DC current only, so the voltage across both should be nearly constant at $V_{DC}$.

Figure 6:
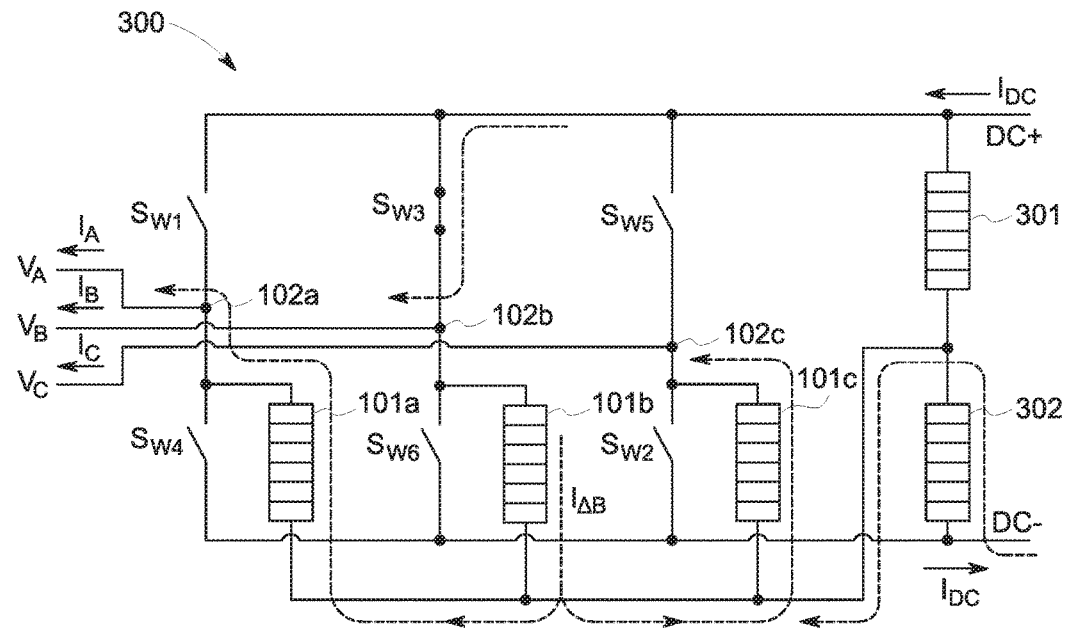
FIG. 6 illustrates current flow in another switch state of the converter of FIG. 3.

FIG. 6 therefore illustrates how the additional chain-link circuits 301 and 302 may be operated in current mode to provide a current path to maintain the DC current in a state where all of the high side or low side director switches are off and not conducting. FIG. 6 illustrates state 6 from Table 1 above. In this state two phases, A and C, are in transition and thus chain-link circuits 101a and 101c are operating in voltage mode. The currents feeding these two chain-link circuits are provided by chain-link converter 101b operating in a current mode to provide a difference current $I_{CLB}$ from the current $I_{DC}$ (where $I_{CLB}=I_{DC}-I_B$) through director switch $S_{W3}$ and also by additional chain-link circuit 302 which provides the current path for $-I_{DC}$. It will be clear therefore that the current through chain-link circuit 302 should be $-I_{DC}$. The various currents being fed into the common line for the chain-link circuits is thus:

$$I_{CLB}-I_A-I_C-I_{DC}=I_{DC}-I_B-I_A-I_C-I_{DC}=0 \quad \text{Eqn. (4)}$$

Thus the DC current is maintained and balance is also maintained and the sum of all the currents into the common line connecting the chain-link circuits is also zero.

In general therefore when only one chain-link current is operating in a current mode the chain-link circuit is operated to provide a defined chain-link current having a component based on the DC current demand minus the AC current demand for that phase.

The additional chain-link circuits clearly represent additional components compared to just the three chain-link circuits of the converter of FIG. 1. It will be appreciated from the discussion above that were the converter only to be operated with a trapezoidal waveform with a value of α less than or equal to π/6 then the additional chain-link circuits 301 and 302 would not be required to provide the current paths needed for current circulation and chain-link circuits 101a-c would be sufficient. Embodiments of the invention may therefore include a converter with chain-link circuits 101a-c, but without additional chain-link circuits 301 and 302 (and possibly without any DC link capacitors or at least any significantly large DC link capacitors), the converter having a controller for operating the converter such that chain-link circuits 101a-c are operated in current mode when not being used in voltage mode and wherein, during, normal operation there is no significant period when all the low side or all the high side director switches are not conducting.

However as mentioned above there may be benefits in operating a switching sequence that includes states where all high side or low side director switches are off at once so as to benefit from reduced THD, and thus reducing the filtering required. In which case the additional chain-link circuits 301 and 302 enable smooth currents to be maintained at the DC terminals (reducing or eliminating the need for large DC link capacitance). In addition, as will be explained later in more detail the additional chain-link circuits 301 and 302 also provide better fault handling characteristics and provide a means for capacitor balancing in the chain-links 101a-c and thus provide advantages even when operating in a sequence of states where there is always at least one high side and at least one low side director switch conducting to provide a current path for the relevant DC rail.

The discussion above shows that with the introduction of additional chain-link circuits 301 and 302 the converter shown in FIG. 4 can be used across all the switching states necessary for a range of operation with a chain-link 101a-c being used in current mode to circulate current as desired when not operating in a voltage mode to control the transition at the relevant AC terminal and with additional chain-link circuits 301 and 302 being used in current mode to ensure continuity of current at the DC terminals when all director switches on the high side or low side are non-conducting at the same time.

The mode of operation of the chain-link circuits 102a-c is thus governed by the relevant switch states, which depends on the phase angle of the relevant phase. In some respects each phase can be seen to be operating independently with the director switch control and mode of operation of the relevant chain-link circuit being defined by the phase angle for that phase and the intercept angle α (for a relatively simple trapezoidal waveform). Thus in some embodiments a controller may implement a state machine to control each phase limb. The state machine may be based on an indication of the instantaneous phase of the power cycle (for that phase limb) and transition between the various states in the required sequence, generating control signals to control the director switches and also to enable the relevant chain-link circuit to operate in voltage mode or current mode.

Figure 7:
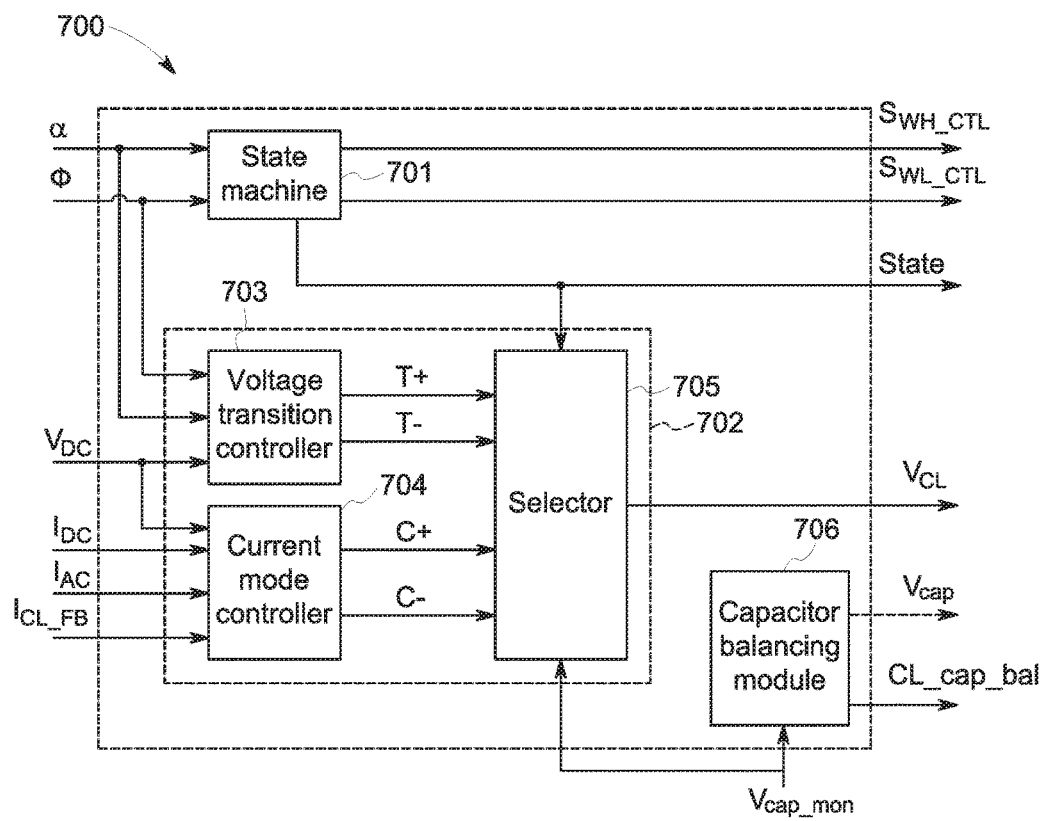
FIG. 7 illustrates one example of a phase controller for controlling the director switches and chain-link circuit for a phase of a converter according to embodiments of the invention.

FIG. 7 illustrates one embodiment of a phase controller 700 for controlling an individual phase of a converter such as illustrated in FIG. 3. The phase controller may comprise a state machine 701 which receives an indication of the intercept angle α and the instantaneous phase angle Φ for that phase and which outputs appropriate switch control signals $S_{WH\_CTL}$ and $S_{WL\_CTL}$ for controlling the high and low side director switches accordingly. The state machine will also provide an indication of the current state to a chain-link circuit voltage controller 702.

It will be noted that for an individual phase operating to provide a symmetrical trapezoidal waveform it can be seen that there are only four main phase cycle states: in transition with the voltage increasing; in the high state with the high side director switch on; in transition with the voltage decreasing; and in the low state with the low side director switch on. In some instances therefore the state machine may cycle between these four switch states. In some instances for ease of control however it may be desired to sub-divide at least one of the transition states into two sub-states, e.g. a transition state with the voltage decreasing from $+V_{DC}$ to zero may be counted as a different state to the voltage decreasing from zero to $-V_{DC}$.

The chain-link circuit voltage controller 702 comprises a voltage transition controller 703 and a current mode controller 704. The voltage transition controller controls the rate of voltage transition. In one example the voltage transition controller 703 receives an indication of the magnitude of the voltage terminals, $V_{DC}$, and also the intercept angle α and instantaneous phase angle Φ and determines at least one transition control signal T+ for the positive transition, i.e. low to high, and at least transition control signal T− for the negative transition. In one example with a simple trapezoidal waveform the positive transition signal may be calculated as $V_{DC} \times \Phi/\alpha$ where Φ varies from $-\pi$ to $+\pi$ and the positive transition occurs between $\Phi=-\alpha$ and $\Phi=\alpha$. In this case the negative transition control signal may be determined as $V_{DC} \times -(\Phi+\pi)/\alpha$ when Φ is between $-\pi$ and $-\pi+\alpha$ and as $V_{DC} \times -(\Phi-\pi)/\alpha$ when Φ is between $\pi-\alpha$ and $\pi$.

The current mode controller 704 controls the voltage of the chain-link circuit when operating in current mode.

As mentioned previously, in current mode control a relevant chain-link circuit may be controlled by a form of dead-beat type control. The voltage of the chain-link circuit may thus be defined so that the voltage across a series connected reactor will give a rate of current so that on a sample-by-sample basis the current arrives at the correct value at the end of that sample.

Considering the chain-link circuit as a voltage source, $V_{CL}$, with some series reactance, $L_{CL}$, and a current transducer. It will be appreciated that in fact the chain-link circuit is not a perfect voltage source and instead has a certain voltage resolution based on the number of chain-link elements but the principle is the same.

Figure 8:
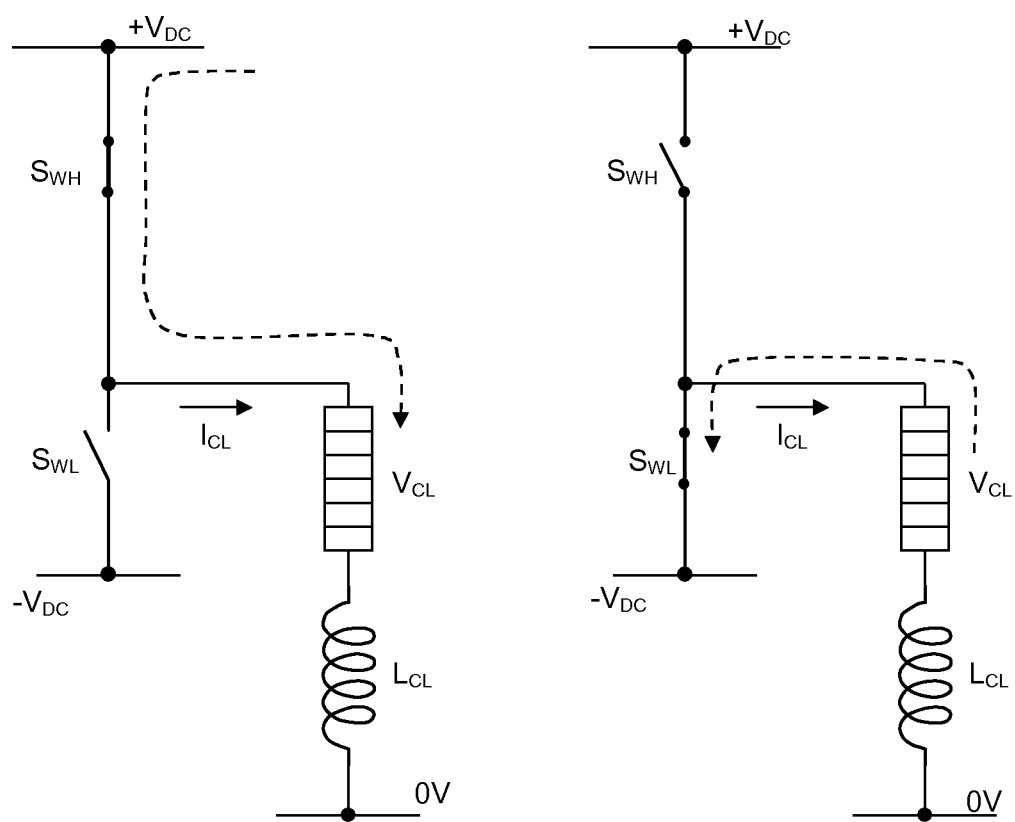
FIG. 8 illustrates the principles of control of a chain-link circuit in current mode.

FIG. 8 illustrates the two states for an individual phase with a chain-link operating in current mode where either the high side director switch $S_{WH}$ or low side director switch $S_{WL}$ will be conducting. It is assumed that the magnitude of the DC voltage at each DC terminal is $V_{DC}$ and that the common point of the chain-link circuit is at 0V. If the phase is in the high state with the high side director switch closed, the current will be given as:

$$V_{DC} - V_{CL} = L_{CL} \frac{I_{n+1} - I_n}{\Delta T} \qquad \text{Eqn. (5)}$$

Where $I_n$ is the measured current and $I_{n+1}$ is the demand current and $V_{CL}$ is the required chain-link voltage so that the measured current equals the demand current at the end of the present sample. Rearranging then gives:

$$V_{CL} = V_{DC} - (I_{n+1} - I_n)\frac{L_{CL}}{\Delta T} \qquad \text{Eqn. (6)}$$

For the case where the phase is in the low state and the chain-link is connected to the negative rail through the low side director switch $S_{WL}$ then $V_{DC}$ and $I_{n+1}$ both become negative in order that the same references can be used.

Referring back to FIG. 7 therefore the current mode controller 704 may therefore receive an indication of $V_{DC}$ and also an indication of the AC current demand $I_{AC}$ and the DC current demand $I_{DC}$, along with a feedback signal indicating the present chain-link current $I_{CL\_FB}$. The chain-link current mode controller will derive the reference chain-link current and implement the dead-beat control to provide a control signal C+ for controlling the chain link current when the high side switch is on and a control signal C− for controlling the chain link current when the low side switch is on.

It will be appreciated however that when an individual chain-link circuit is operating in current mode and thus acting as a current source the actual current demand can vary according to the specific state of the overall converter. As mentioned above, if α is less than π/6 then in some states there will be two high side or low side director switches conducting at the same time and the $I_{DC}$ current may be divided between both director switches. In such a case the current reference for controlling the relevant chain-link circuits will be based on a current of $\pm I_{DC}/2$ through the relevant director switch rather than $I_{DC}$ as in a state with only high side or low side director switch conducting. As will be described in more detail below an overall control can determine the current demand, e.g. $I_{DC}$, for the individual phase based on the overall converter state. Thus the individual phase controller can simply respond to the indicated current demand.

The control signals from the voltage transition controller 703 and current mode controller 704 may be passed to selector 705 which determines the appropriate control signal to use based on the state of the phase indicated by the state machine 701. The output of the selector may be a voltage control signal $V_{CL}$ for controlling the voltage of the chain-link circuit.

Figure 9:
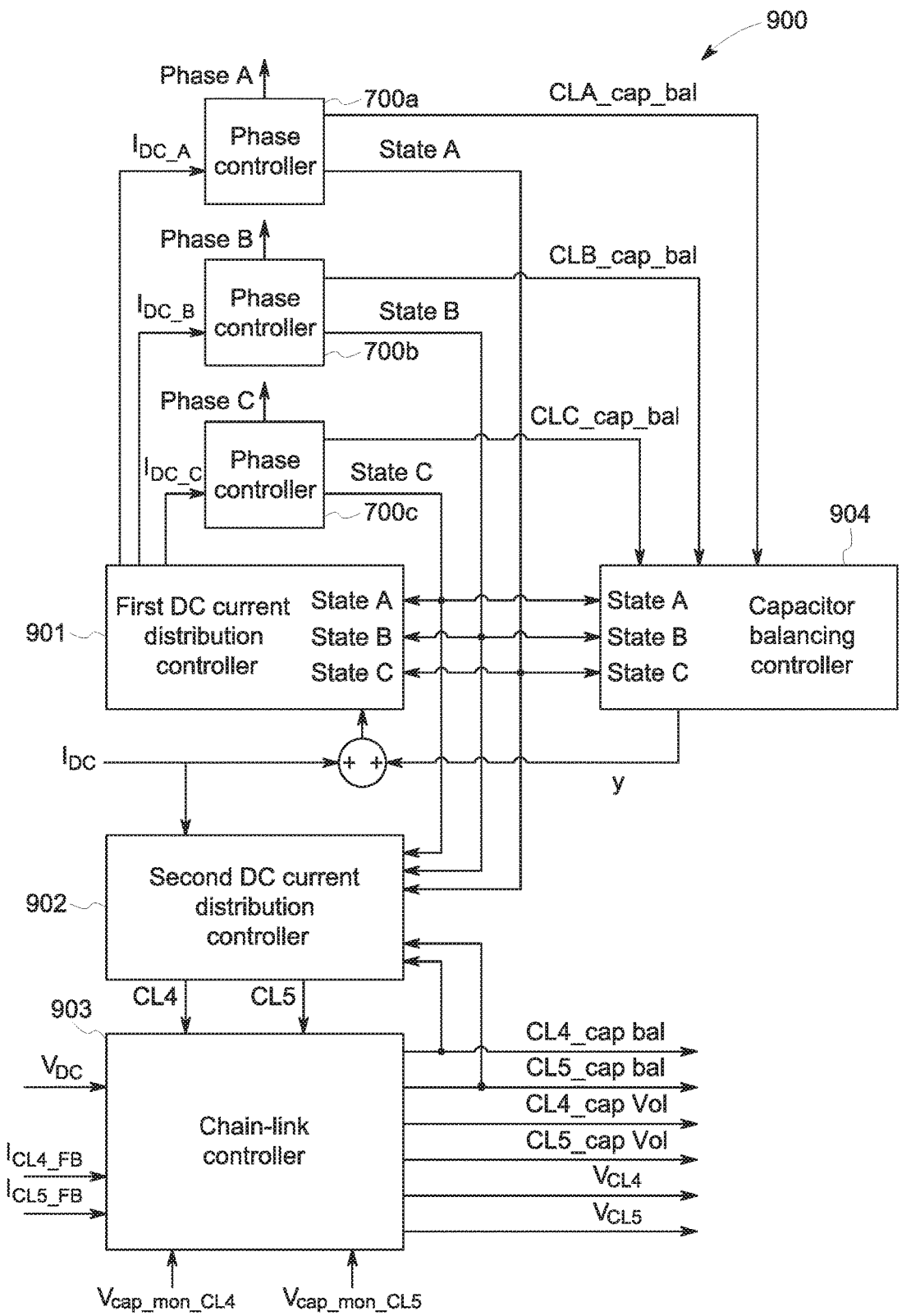
FIG. 9 illustrates one example of a control system for a converter according to embodiments of the invention.

FIG. 9 illustrates one example of a control system 900 for the whole converter such as illustrated in FIG. 3. The control system has a phase controller 700a-c for each phase. Each phase controller may be a phase controller as described above with reference to FIG. 7. The phase controller have the inputs described above with reference 7 but only the $I_{DC}$ input used for chain-link current mode control is indicated in FIG. 9 for clarity. FIG. 9 also indicates the various control outputs, e.g. the control signals for the director switches and chain-link controls signals as a single output, "Phase A" etc. for clarity.

As illustrated in FIG. 7 the phase controller 700 may output the relevant switch state for the phase as determined by the state machine 701. A first DC current distribution controller 901 may be arranged to receive the indication of the state of each of the individual phases and determine the DC current for each phase accordingly. The first DC current distribution controller 901 may implement a truth table such that in the event that any two of the phases are both in high state or both in the low state the DC current demands for each of those phases is set to $I_{DC}/2$ as described above.

The control system 900 also includes a second DC current distribution controller 902 which is used to determine when a DC current should be supplied by the additional chain-link circuits 301 and 302. The second DC current distribution controller 902 therefore also receives the indication of the state of each of the phases. The second DC current distribution controller 902 may also implement a truth table such that in the event that two phases are both in transition, and thus all of the high side or all of the low side director switches are off, the relevant additional chain-link 301 or 302 is activated to provide the required DC current. The second DC current distribution controller 902 therefore receives an indication of the actual DC current demand $I_{DC}$ and generates controls signals CL4 and CL5 setting the current demand for the additional chain-link circuits.

These signals may be passed to an additional chain-link controller 903. This additional chain-link controller may be similar to the chain-link voltage controller 702 described above that form part of a phase controller 700. Thus the additional chain-link controller 903 may receive feedback current signals $I_{CL4\_FB}$ and $I_{CL5\_FB}$ from the additional chain-link circuits 301 and 302 along with an indication of $V_{DC}$. The additional chain-link controller 903 may generate control signals $V_{CL4}$ and $V_{CL5}$ for controlling the additional chain-link circuits 301 and 302.

The control systems illustrated in FIGS. 7 and 9 can thus operate a converter such as the embodiment shown in FIG. 3 and use the chain-link circuits 101a-c associated with each phase and/or additional chain link circuits 301 and 302 to enable current circulation to provide the correct current for each individual phase whilst maintaining a substantial smooth DC current.

In using chain-link circuits to synthesise voltage waveforms and/or regulate current it is important to maintain the correct charge on the capacitors (or other energy storage devices) of the chain-link circuits. Maintaining the capacitor charge is important not only in terms of preventing over-charge of the capacitors, but in terms of maintaining the correct current flow through the converter bridge.

It will be appreciated that during the transition period energy may accumulate within the chain-link capacitors. This can lead to an increase in the average voltage of the capacitors of the sub-modules of the chain-link circuit. If charge balance is not maintained the current regulation provided when subsequently operating the chain-link circuits in current mode may not be accurate which may lead to problems in operation.

In embodiments of the present invention current mapping techniques are used to allow a reset current to flow to provide charge balancing for the capacitors of the chain-links. In other words an indication of any capacitor charge imbalance may be determined, e.g. a rise in the average voltage of the sub-modules of the chain-link circuit, and used to control differential currents flowing through the chain-link circuits 101a-c, and possibly additional chain links 301 and 302, to provide capacitor charge balancing.

The energy that will be contained within a chain-link circuit can be represented as the energy within the individual capacitors within the chain-link elements. This may be expressed as:

$$E_{CL} = \tfrac{1}{2} \Sigma_{i=1}^{Nm} Cm_i \cdot Vm_i^2 = \tfrac{1}{2} \cdot Cm \cdot Nm \cdot Vm_{av}^2 \qquad \text{Eqn. (7)}$$

where $Cm_i$ is the capacitance of the $i^{th}$ sub-module, $Vm_i$ is the voltage across the $i^{th}$ sub-module, Nm is the number of sub-modules and $Vm_{av}$ is the average voltage across a sub-module.

The square of the average (or total) voltage value of the capacitors of the sub-modules, or a value proportional thereto, may therefore be used to determine a control signal for providing capacitor balancing for controlling the overall voltage levels of the capacitors of the chain-link circuits.

The voltages of the capacitors of the sub-modules will typically be measured in practice as part of the control of the chain-link circuit. The capacitor voltages may for instance be measured to ensure that the capacitor voltages are not out-of-bounds. The capacitor voltages may also be measured to allow for control over the selection of the sub-modules as will be explained later.

In one embodiment therefore the sum of the various capacitor voltages may be determined and used to determine the average capacitor voltage Vm. This derived average value of the voltages of the capacitors of the chain-link elements can be used as part of a control for regulating the average capacitor voltage. In one embodiment the average value of capacitor voltage may be squared and this $Vm^2$ value may be compared with a reference voltage value and filtered to remove strong second harmonic terms. This filtered error signal can be used to generate a feedback signal for regulating the capacitor voltages, for instance using a form of PI type control. It will of course be appreciated that the sum of the capacitor values could instead be squared and compared to an appropriate reference value (or some other proportional value could be used).

This control signal can be used to regulate the DC current demand for the chain-link circuit when operating in current demand so as to reset any variation in average charge level due to operation, e.g. in voltage mode.

As well as regulating the overall or average voltages of the capacitors of the sub-modules the individual capacitances of the various sub-modules should be balanced, i.e. to ensure that voltage values of the sub-modules do not differ greatly from one another. In one embodiment a sub-module management block may also monitor the voltages of the capacitors of the energy storage elements so as to allow appropriate selection of the sub-module capacitors to be connected into and out of the series connection. In one embodiment the voltages of the capacitors of all the sub-modules are measured and ranked in order of charge/voltage. In cases where a positive current is required, i.e. the capacitors will discharge, the capacitors with the greatest charge may be selected in sequence to provide the required transition. In cases where a negative current flows i.e. the capacitors will charge, the capacitors with the lowest charge may be selected in sequence. This method means that the capacitors with the greatest charge are those selected to discharge and the capacitors with the lowest charge are those selected to charge. This method ensures that the voltages of the capacitors do not vary too greatly from one another. In theory the sub-modules could be re-sorted every sample period but in practice this may result in rapid switching of the sub-modules. It may therefore be preferred to maintain a register of sort order and only revise the position of a sub-module capacitor in the register if it varies from the average capacitor voltage.

Referring back to FIG. 7 the phase controller 700 may therefore have a capacitor balancing module 706 for determining a control signal indicating the reset or compensation current required to provide balancing of the voltages of the capacitor of that chain-link circuit over the power cycle.

Capacitor balancing module 706 may receive an indication of the chain-link voltage $V_{CL}$ and current $I_{CL\_FB}$ together with an indication of the monitored/measured capacitor voltages $V_{cap\_mon}$ and generate a control signal CL_cap_bal for regulating the overall capacitor voltages by regulating the DC current demand. The capacitor balancing module may also optionally output an indication, $V_{cap}$, of the sum of the voltages of the capacitors of the chain-link circuit.

In this embodiment capacitor balancing module 706 is provided to balance or regulate the average capacitor voltage values by controlling a trimming or reset current flowing between the DC terminals via the chain-link circuits when operating in current mode. In addition there may be a sub-module selection control for ensuring that the voltage of the chain-link circuit is shared equally between the various sub-modules which may involve ranking the sub-modules by measured voltage and selecting the sub-modules accordingly as described above. In the embodiment shown in FIG. 7 this sorting and selection function is performed by selector 705. Selector 705 therefore also receives an indication of the monitored values of each of the sub-module voltages. It will be appreciated however that these various functions could be implemented in different arrangements and the capacitor balancing module could provide a selection function.

Figure 10:
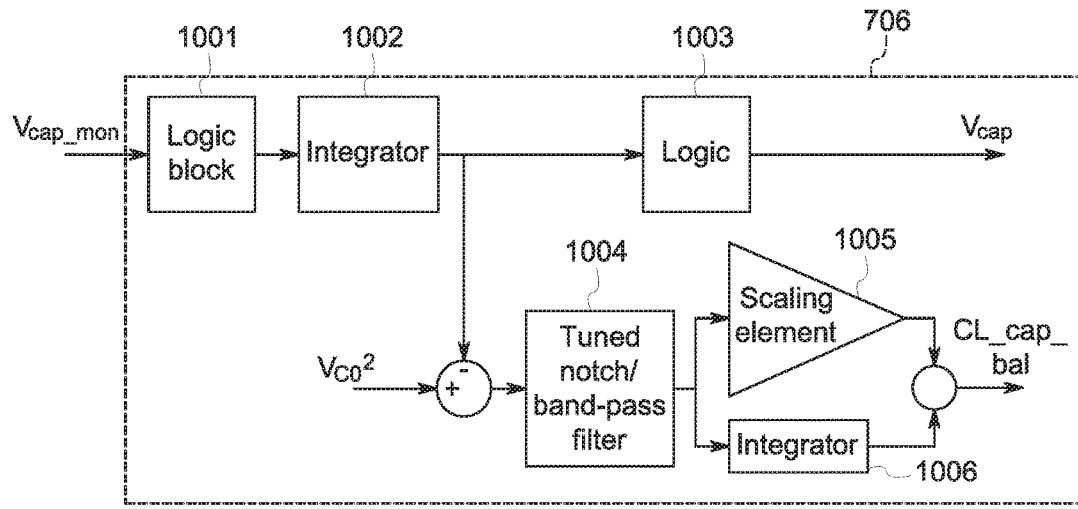
FIG. 10 illustrates one example of a capacitor balancing module.

FIG. 10 illustrates one embodiment of a suitable capacitor balancing module 706. Logic block 1001 receives the measured voltages of the capacitors of the sub-modules of the chain-link circuit, V_cap_mon and sums and squares these voltages to provide a value. An integrator 1002 integrates this value to produce a value related to $Vm^2$. This value can then be processed by logic 1003, e.g. subject to a square root function, to output a value $V_{cap}$ of the total voltage of the sub-modules of the chain-link circuit. The $Vm^2$ value, which represents the additional energy stored over the cycle can be compared with a reference value $V_{co}^2$ and the error signal passed to tuned notch/band-pass filter 1004 to remove any second harmonic component. The filtered error signal is passed to a PI controller comprising scaling element 1006 and integrator 1006 to produce the control signal CL_cap_bal for that phase. This control signal is used to regulate the DC current demand.

The necessary reset or trimming current required to achieve voltage balancing of a chain-link circuit can be achieved by adding an appropriate current component to the current flowing when the chain-link circuit is operating in current mode control. To balance the three chain-circuits 101a-c over a power cycle resetting currents $i_{dchA}$, $i_{dchB}$ and $i_{dchC}$ may be generated. It will be appreciated from the discussion above however that depending on the overall state of the converter there may be a different number of the chain-link circuits 101a-c operating in current mode.

As mentioned above operation of the converter with a symmetrical trapezoidal waveform will involve six "base states", i.e. the six switch states that would occur were the value of α equal to π/6. In each of these six base states one phase is in transition, with the relevant chain-link circuit 101a-c operating in voltage mode, and the other two phases are in the high state and low state respectively with the relevant chain-link circuits both operating in current mode. Thus throughout a complete power cycle for these six base states each pairing of chain-link circuits, e.g. 101a and 101b, will occur twice, as indicated in table 2 below:

TABLE 2

| −ve | +ve |
|---|---|
| CLC | CLB |
| CLA | CLB |
| CLA | CLC |
| CLB | CLC |
| CLB | CLA |
| CLC | CLA |

These six pairings can be reduced to three distinct pairings when discounting duplicates.

Over the power cycle the resetting currents $i_{dchA}$, $i_{dchB}$ and $i_{dchC}$ are generated from the common currents that pass through the pairs of chain-link circuits, $i_{dchAB}$, $i_{dchAC}$ and $i_{dchBC}$ in these states. These relationships may be expressed as:

$$i_{dchA} = (i_{dchAB} + i_{dchAC})/2$$

$$i_{dchB} = (i_{dchAB} + i_{dchBC})/2$$

$$i_{dchC}(i_{dhBC} + i_{dchAC})/2 \qquad \text{Eqn. (9)}$$

Rewriting this in matrix form gives:

$$\begin{pmatrix} i_{dchA} \\ i_{dchB} \\ i_{dchC} \end{pmatrix} = \begin{pmatrix} 1/2 & 1/2 & 0 \\ 1/2 & 0 & 1/2 \\ 0 & 1/2 & 1/2 \end{pmatrix} \cdot \begin{pmatrix} i_{dchAB} \\ i_{dchAC} \\ i_{dchBC} \end{pmatrix} \quad \text{Eqn. (10)}$$

Inverting the square matrix then gives:

$$\begin{pmatrix} i_{dchAB} \\ i_{dchAC} \\ i_{dchBC} \end{pmatrix} = \begin{pmatrix} 1 & 1 & -1 \\ 1 & -1 & 1 \\ -1 & 1 & 1 \end{pmatrix} \cdot \begin{pmatrix} i_{dchA} \\ i_{dchB} \\ i_{dchC} \end{pmatrix} \quad \text{Eqn. (11)}$$

Thus, for example in state shown in FIG. 4 where chain-link circuits 101b and 101c are both operating in current mode, and the chain-link circuit 101a is operating in voltage mode, the currents flowing in chain-link circuits 101b and 101c may be adjusted by a current component $i_{dchBC}$ which is equal to:

$$i_{dchBC} = i_{dchB} + i_{dchC} - i_{dchA} \quad \text{Eqn. (12)}$$

As mentioned above if the value of α is less than π/6 then in addition to the six base states there will in addition be various states where all three chain-link circuits 101a-c are operating in current mode as shown in table 3:

TABLE 3

| −ve | +ve |
|---|---|
| CLC + CLA | CLB |
| CLA | CLB + CLC |
| CLA + CLB | CLC |
| CLB | CLA + CLC |
| CLB + CLC | CLA |
| CLC | CLA + CLB |

Again this reduces to three distinct states with duplicates removed. For these states the DC current for the two positive or two negative chain-link circuits may be equal to $I_{DC}/2$ as described above. Thus in these states the trimming or compensation currents required in the chain-links circuits can be identified as:

$$i_{dchA} = i_{dchA\_BC}/2 + (i_{dchB\_CA} + i_{dchC\_AB})/4$$

$$i_{dchB} = i_{dchB\_CA}/2 + (i_{dchA\_BC} + i_{dchC\_AB})/4$$

$$i_{dchC} = i_{dchC\_AB}/2 + (i_{dchA\_BC} + i_{dchB\_CA})/4 \quad \text{Eqn. (13)}$$

where a current $i_{dchA\_BC}$ represents the current flowing when chain-link circuit 101a is connected to one DC terminal with chain-link circuits 101b and 100c connected in parallel to the other DC terminal, i.e. in states 16 and 21 from table 1 above and currents $i_{dchB\_CA}$ represents the currents flowing in states 15 and 22 and $i_{dchC\_AB}$ represents the currents flowing in states 13 and 24.

Rewriting this in matrix form gives:

$$\begin{pmatrix} i_{dchA} \\ i_{dchB} \\ d_{chC} \end{pmatrix} = \begin{pmatrix} 1/2 & 1/4 & 1/4 \\ 1/4 & 1/2 & 1/4 \\ 1/4 & 1/4 & 1/2 \end{pmatrix} \begin{pmatrix} i_{dchA\_BC} \\ i_{dchB\_CA} \\ d_{chC\_AB} \end{pmatrix} \quad \text{Eqn. (14)}$$

Inverting this to give the combining function gives:

$$\begin{pmatrix} i_{dchA\_BC} \\ i_{dchB\_CA} \\ d_{chC\_AB} \end{pmatrix} = \begin{pmatrix} 3 & -1 & -1 \\ -1 & 3 & -1 \\ -1 & -1 & 3 \end{pmatrix} \begin{pmatrix} i_{dchA} \\ i_{dchB} \\ d_{chC} \end{pmatrix} \quad \text{Eqn. (15)}$$

Thus, for example in the state where all of the chain-link circuits 101a-c are operating in current mode with chain-link circuits 101a and 102b connected to the same DC terminal, the currents flowing in the chain-link circuits 101a-c may be adjusted by a current component $i_{dchC\_AB}$ which is equal to:

$$i_{dchC\_AB} = 3i_{dchC} - i_{dchA} - i_{dchB} \quad \text{Eqn. (16)}$$

As also mentioned above if the value of α is greater than π/6 then in addition to the six base states there will in addition be various states where only one chain-link circuit 101a-c is operating in current mode. In which case the compensation current component in the chain-link component may be equal to the identified compensation current for the relevant chain link, i.e. $i_{dchA}$, $i_{dchB}$ or $i_{dchC}$.

Referring back to FIG. 9 the phase controller 700a-c for each phase may therefore derive an indication of the required compensation or balancing current, CL_bal_cap as described above with respect to FIG. 10. A capacitor balancing controller 904 may therefore receive the indication of balancing current demand from each phase controller and also an indication of the current state of each phase. Based on the overall state of the converter, i.e. which chain-link circuits are operating in current mode, the capacitor balancing controller 904 generates an indication of the current balancing component y according to the discussion above. In some instance the capacitor balancing controller 904 may implement a form of look-up table. In the embodiment illustrated in FIG. 9 the capacitor balancing current component is added to the DC current $I_{DC}$ value used by the first DC current distribution controller 901.

A similar approach may be used to ensure capacitor balancing of additional chain-link capacitors 301 and 302. Thus the additional chain-link controller 903 may comprise a capacitor balancing module (not separately illustrated) along the lines described above with respect to FIG. 10 to generate an indication of a reset or compensation current required for each of additional chain-link circuits 301 and 302. The additional chain-link circuits may be controlled so that when not being used to pass the required current $I_{DC}$, the required resetting current may be provided. In other words in a state where all high side or low side director switches are off simultaneously, additional chain-link circuit 301 or 302 respectively may be used to provide the current $I_{DC}$ with the other additional chain-link circuit being controlled according to the reset current demand for that chain-link. In the case that neither of the additional chain-link circuits 301 and 302 are required to provide $I_{DC}$, i.e. there is at least one high side director switch and one low side director switch conducting, both of the additional chain-link circuits 301 and 302 may be controlled to provide a resetting current appropriate for that chain-link circuit (if required). The additional chain-link controller 903 may therefore receive monitored values of the voltages of the sub-modules of the additional chain-link circuits 301 and 302, $V_{cap\_mon\_CL4}$ and $V_{cap\_mon\_CL5}$.

The idea of using the chain-link circuits 101a-c in a current mode when not being used to control a voltage transition to provide a resetting or trimming current that ensure that the voltages of the capacitors of the chain-link circuits remain within predetermined bounds represents another novel aspect of the present invention. It has been appreciated that in each of a plurality of converter states a compensation current can flow between the DC terminals of the converter by at least two chain-link circuits that are being used in current mode. As the states of the converter vary over the power cycle the combination of chain-link circuits operating together in current mode will change. It has been appreciated that the current in each individual chain-link in each state can be controlled so that over the whole power cycle the sum of the compensation current flowing through each chain-link circuit is sufficient to maintain the correct charge/voltage of the capacitors for each chain-link.

This idea is applicable to controlled transition bridge type converters with just three chain-link circuits for the three phases and is applicable to conventional controlled transition bridge type converters as described above with reference to FIG. 1.

To demonstrate the principles and operation of embodiments of the present invention a converter such as shown in FIG. 3 and operating as described above with a simple trapezoidal waveform and with value of α equal 0.6283 (i.e. the value of $\alpha_m$ from FIG. 5) was modelled. The converter was modelled operating at 700 MW with 200 MVA quadrature power.

Figure 11:
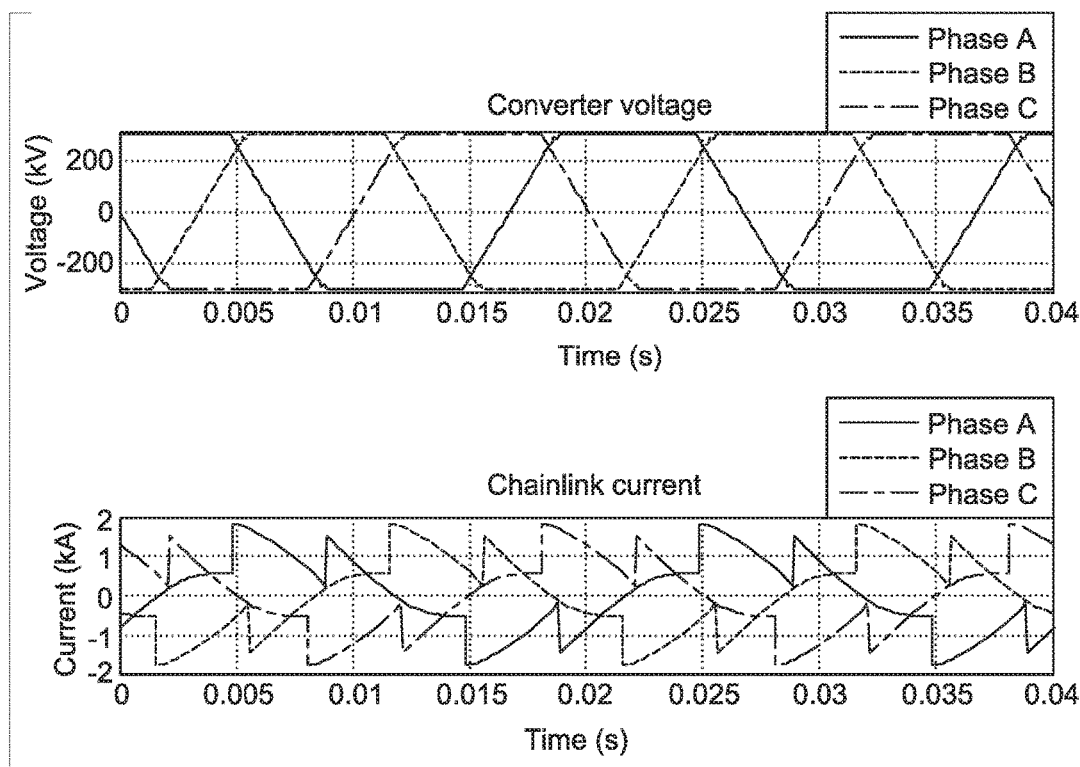
FIG. 11 shows modelled voltage waveforms and chain-link currents for a converter according to embodiments of the invention.

FIG. 11 shows the shows the derived trapezoidal AC voltages at the AC nodes 102a-c and also the currents through the chain-link circuits 101a-c. It can be seen that the converter is operating to provide the required waveforms at the AC nodes and that is a short period towards the beginning and end of each transition where two phases are both in transition. It can be further seen that the currents of the chain-links circuits 101a-c are controlled when not in transition.

Figure 12:
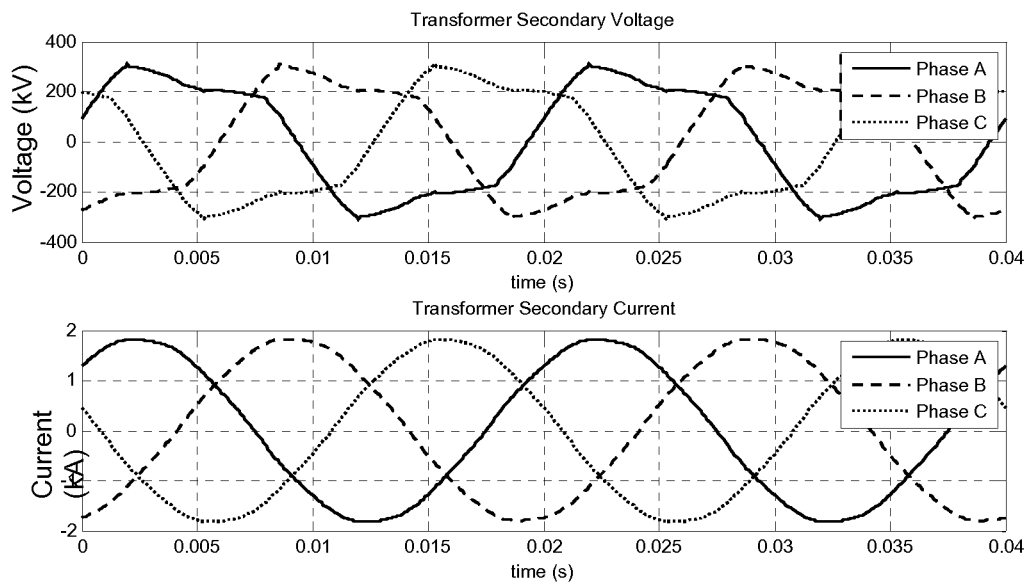
FIG. 12 shows modelled transformer secondary voltages and currents.
Figure 13:
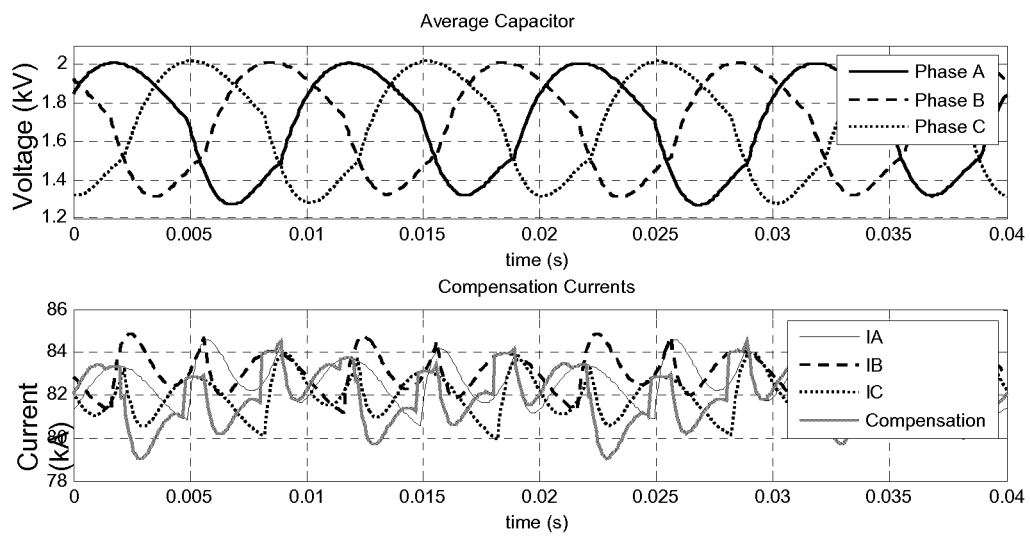
FIG. 13 shows modelled values of the average capacitor voltages of the chain-link circuits and the required compensation currents.

FIG. 12 shows the voltages and currents at the secondary of the power transformer coupling the converter to the power grid. In particular this shows how little distorted the AC current is. FIG. 13 shows the average capacitor voltage ripple for chain-link circuits 101a-c. In this model the chain-link circuits were assumed to be composed of 177 sub-modules, each sub-module having a capacitor of nominal 4 mF capacitance. FIG. 13 also shows the reset currents determined for each of the chain-link circuits 101a-c and the overall compensation current component calculated, e.g. the compensation value γ derived from the capacitor balancing controller 904 shown in FIG. 9. It can be seen the average capacitor values vary over the power cycle but are reset over the period of the power cycle and thus remain within predetermined bounds.

Figure 14:
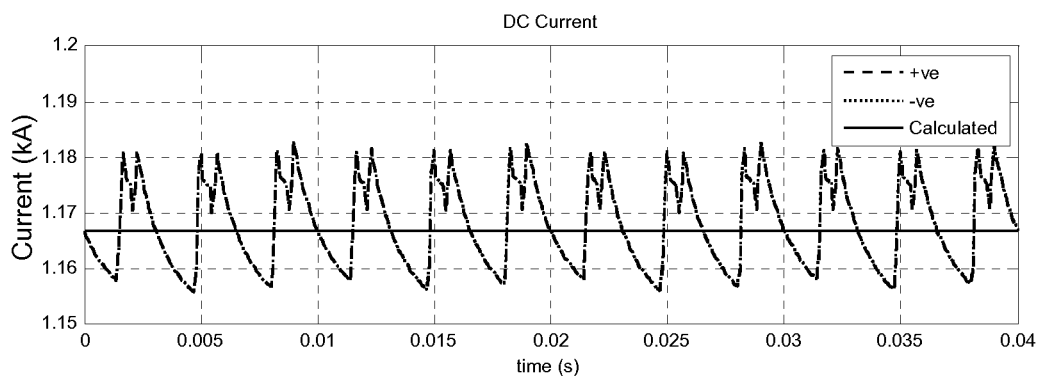
FIG. 14 shows modelled values of current in the DC positive and negative terminals and calculated current.

FIG. 14 shows the DC currents at the positive and negative DC terminals against the calculated DC current. It can be seen that the positive and negative DC currents overlay very well and that the ripple is very small.

Figure 15:
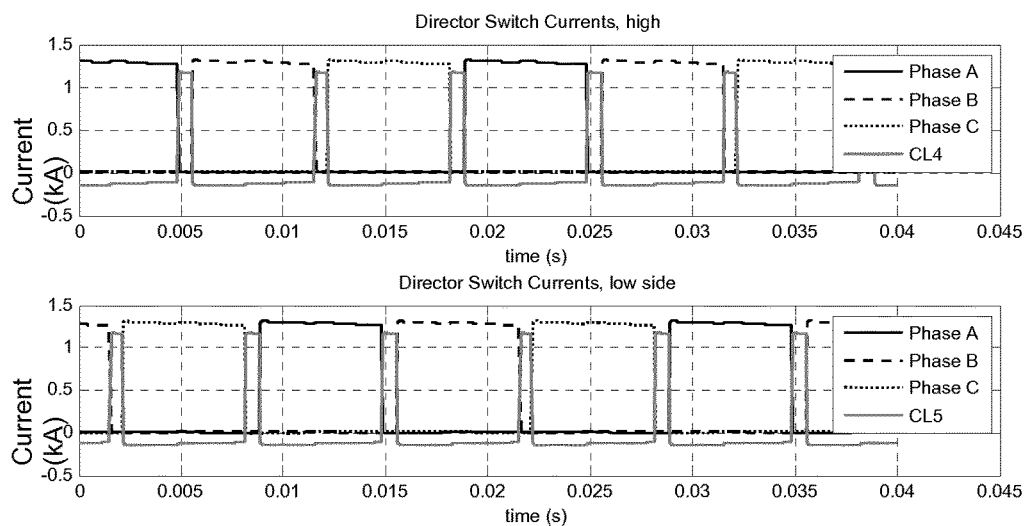
FIG. 15 shows modelled currents through the director switches and additional chain-link circuits.

FIG. 15 shows the currents flowing in the director switches of the bridge and those in additional chain-link circuits 301 and 302. The top plot shows the high side director switch currents and the current through additional chain-link circuit 301 (CL4) whilst the lower plot shows the low side director switch currents and the current through additional chain-link circuit 302 (CL5). It will be seen that the current through additional chain-link circuit 301 goes high in the period when none of the high side switches is conducting to provide the $I_{DC}$ current. When one of the high side director switches is conducting the additional chain-link circuit exhibits a small discharge current for capacitor balancing of chain-link circuit 301. Likewise additional chain-link circuit 302 provides $I_{DC}$ when none of the low side director switches are conducting and otherwise passes a relatively small resetting current.

Figure 16:
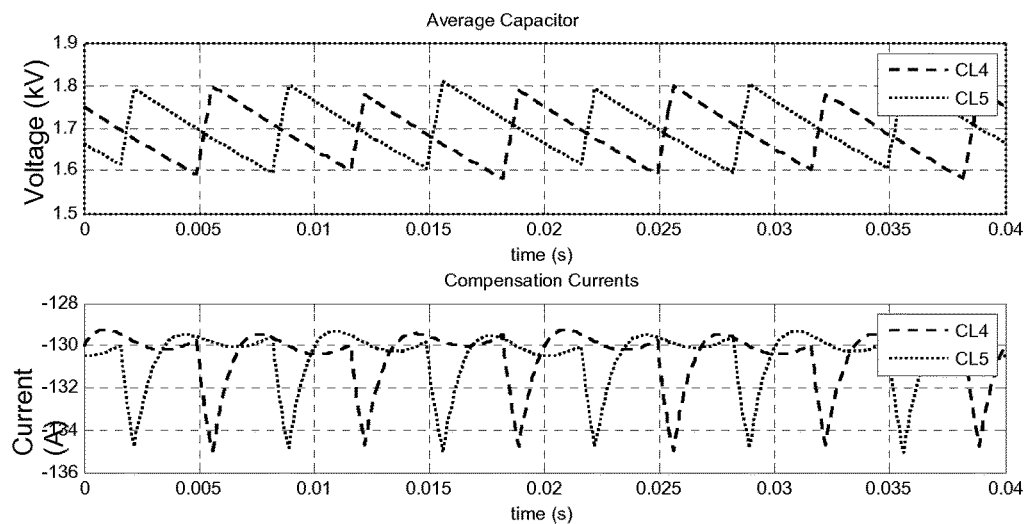
FIG. 16 shows modelled values of the average capacitor voltages of the additional chain-link circuits and the relevant compensation currents.

FIG. 16 shows the average capacitor voltage and reset currents for additional chain-link circuits 301 (CL4) and 302 (CL5). It will be seen that the capacitor voltages rise during the period that the relevant chain-link circuit is acting as a current source and then is reset over the rest of the power cycle.

These simulations show that a converter operating such as described above can provide the required AC and DC currents and voltage without significant distortion or ripple, reducing the requirements for DC link capacitors and AC or DC filtering.

The description above has focussed on operation with a trapezoidal waveform with a constant voltage ramp during the transition. As discussed above operating with an intercept angle for this slope of a greater than π/6 can be useful in reducing distortion.

One problem with using a simple trapezoidal waveform however is that voltage magnitude control can be relatively limited. In HVDC power distribution it is expected that the variation in AC voltage may be relatively lower, for example it is comment to expect an AC voltage variation of less than ±6% in normal operation. However with a simple trapezoidal waveform it may be difficult to achieve such a degree of variation. LCC and MMC type converters typically rely on tap changers within the transformer to set an optimal operating condition that will yield minimum losses; however conventional tap changers are slow and while normal grid variations are also slow, ideally this should not be relied upon, particularly since an important advantage of having a wider fundamental voltage variation is associated with fault ride through, when a single phase fault occurs.

Figure 17:
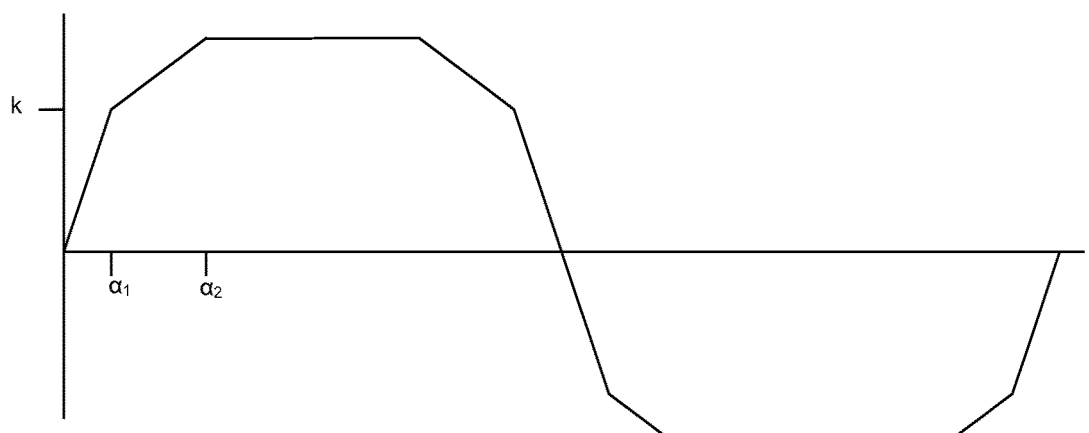
FIG. 17 illustrates a dual-slope trapezoidal waveform driving scheme for a converter according to embodiments of the invention.

In some embodiments therefore the waveform generated at the AC node 102a-c may be a dual-slope trapezoidal waveform. FIG. 17 illustrates a dual slope trapezoidal waveform. In such a waveform the transition has two slopes. This waveform may be defined with three variables, a first angle intercept $\alpha_1$ defining the phase angle at which the slope of the transition change, a second angle intercept $\alpha_2$ which defines the intercept with the relevant DC rail voltage and the value k of the voltage at the interchange between the two slopes. Within certain constraints these three variables can all be treated as independent. Using established principles of Selective Harmonic Elimination, as will be understood by one skilled in the art, each variable could be considered as a degree of freedom and each degree of freedom can be used to control one aspect of the resulting waveform, such eliminating a harmonic. It is also possible to use one degree of freedom to control the fundamental magnitude. Thus with the waveform illustrated in FIG. 17 there is the possibility of cancelling two harmonics and also regulating the fundamental magnitude.

Ideally the value of $\alpha_2$ is chosen to maintain a significant portion of the power cycle at the relevant DC rail voltage, thus maintaining the benefits of having relatively high efficiency/low loss director switches enabled for a significant portion of the power cycle. Various methods exist to solve the values of $\alpha_1$, $\alpha_2$ and k that provides desired harmonic cancellation or minimisation whilst offering control over the fundamental magnitude. Whilst for a two-slope trapezoidal waveform the theoretical THD may increase with increasing duty cycle for the director switches (i.e. reducing values of $\alpha_2$) the actual THD measured in practice will modified by the potential division of the converter phase reactance and the impedance of the AC grid and thus the THD can be maintained within acceptable limits, e.g. less than 0.5%.

In general therefore embodiments of the invention provide a controlled transition bridge type converter and methods and apparatus for the control of such a converter with several advantages.

As mentioned above the use of chain-links to provide soft switching of the director switches reduces the switching an control requirements of the director switches. The director switches may, in some embodiments, comprises thyristors. As will be appreciated by one skilled in the art thyristors may offer a lower on-resistance than semiconductor switches such as IGBTs. A converter according to embodiments of the invention may therefore offer good efficiency.

The current mapping method of control described above offers a practical method of controlling such a converter that avoids the need for large DC link capacitance. In some applications only relatively small DC link capacitances may be required. For example in some embodiments any DC link capacitors may have a value of less than 10 mF. In some instances DC link the DC link capacitances may be no greater than about 5 mF, for example of the order of 4 mF.

The current mapping method also allows for control that permits balancing of the capacitors of the chain-link circuits.

The inclusion of additional chain-link circuits 301 and 302 allow for converter switch states in which only one phase has a director switch conducting. Such switch states can allow for the use of waveforms at the AC nodes of the various phases that have relatively low distortion characteristics, reducing the need for filtering.

It should be noted that the above-mentioned embodiments illustrate rather than limit the invention, and that those skilled in the art will be able to design many alternative embodiments without departing from the scope of the appended claims. The words "including," "having," "comprising," and all derivations thereof should be construed as open-ended transitional phrases unless otherwise stated and, therefore, use of said phrases herein does not exclude the presence of additional elements or steps relative to those listed in a claim or described in the specification, "a" or "an" does not exclude a plurality, and a single feature or other unit may fulfil the functions of several units recited in the claims. Any reference signs in the claims shall not be construed so as to limit their scope.

The invention claimed is:

1. A voltage source converter comprising:
a plurality of phase limbs connected between high and low DC terminals; wherein each phase limb comprises:
a high side director switch connecting the high DC terminal to an AC node for that phase limb;
a low side director switch connecting the AC node to the low DC terminal; and
a chain-link circuit, a first end of the chain-link circuit being directly connected between the high side and low side director switches to be electrically coupled to the AC node;
first and second additional chain-link circuits, wherein first ends of the first and second additional chain-link circuits are connected to the high side DC terminal and low side DC terminals respectively; and
a converter controller configured to control the director switches of each phase limb in a power cycle and to control the chain-link circuits of each phase limb in a voltage mode to provide a controlled voltage transition at the AC node during the power cycle, wherein said converter controller is operable to control at least some of said chain-link circuits in a current mode to provide a defined current at times during the power cycle;
wherein each chain-link circuit comprises a plurality of series-connected chain-link modules, each of the chain-link modules comprising at least one energy storage element that can be selectively connected in series with the other modules or bypassed; and
wherein a second end of each of the chain-link circuits is connected to a common node such that, in use, a current can flow from one phase limb to another via the respective chain-link circuits.

2. The voltage source converter as claimed in claim 1 wherein the converter controller is configured to:
control the chain-link circuit of each phase limb in a voltage mode to provide a defined voltage transition at the AC node during a transition state between one director switch being turned off and the other director switch being turned on; and
operate the chain-link circuit of a phase limb in current mode for at least part of the time when that phase limb is not in a transition state.

3. The voltage source converter as claimed in claim 1, wherein the converter controller is configured to determine the defined current flow for each chain-link circuit operating in current mode based on an indication of AC and DC current demand and the switch states of each of the phase limbs of the voltage source converter.

4. The voltage source converter as claimed in claim 1, wherein the voltage source converter has three phase limbs and is operable in use in a repeating sequence of converter switch states comprising a first plurality of converter states in which:
one phase is in a high state with the high side director switch on and the low side director switch off;
one phase limb is in a low state with the low side director switch on and the high side director switch off; and
one phase limb is in a transition state,
wherein, when the voltage source converter is in one of said first plurality of converter states the converter controller:
operates the chain-link circuit of the phase limb in the high state in current mode to provide a defined chain-link current having a component based on a DC current demand minus an AC current demand for that phase; and/or
operates the chain-link circuit of the phase limb in the low state in current mode to provide a defined chain-link current having a component based on a DC current demand minus an AC current demand for that phase.

5. The voltage source converter as claimed in claim 1, wherein the voltage source converter has three phase limbs and is operable in use in a sequence of converter switch states comprising a second plurality of converter states in which:
two phase limbs are in the same one of a high state, in which the high side director switch is on and the low side director switch is off, or a low state, in which the low side director switch is on and the high side director switch is off, and
the other phase limb is in the other of high state or the low state,
wherein, when the voltage source converter is in one of said second plurality of converter states, the converter controller:
operates one of the chain-link circuits of the two phase limbs which are in the same state to provide a defined chain-link current having a component based on a first fraction of a DC current demand minus an AC current demand for that phase, and operates the other of the chain-link circuits of the two phase limbs which are in the same state to provide a defined chain-link current having a component based on a second fraction of the DC current demand minus the AC current demand for that phase; wherein the first and second fractions together equal a value of substantially one.

6. The voltage source converter as claimed in claim 5 wherein, when the voltage source converter is in one of said second plurality of converter states the converter controller operates the chain-link circuit of the phase limb in the other state to provide a defined chain-link current having a component based on a DC current demand minus an AC current demand for that phase.

7. The voltage source converter as claimed in claim 1, wherein the voltage source converter has three phase limbs and is operable in use in a sequence of converter switch states comprising a third plurality of converter states in which:

two phase limbs are in a transition state; and
the other phase limb is in one of a high state, in which the high side director switch is on and the low side director switch is off, or a low state, in which the low side director switch is on and the high side director switch is off,
wherein the converter controller is configured, in use, to:
operate the first additional chain-link circuit to provide a defined current for at least part of a time when the voltage source converter is in one of said third plurality of converter states and one phase limb is in the low state; and/or
operate the second additional chain-link circuit to provide a defined current for at least part of a time when the voltage source converter is in one of said third plurality of converter states and one phase limb is in the high state.

8. The voltage source converter as claimed in claim 7 wherein, when the voltage source converter is in one of said third plurality of converter states, the converter controller operates the chain-link circuits of the phase limb in the high state or low state to provide a defined chain-link current having a component based on a DC current demand minus an AC current demand for that phase.

9. The voltage source converter as claimed in claim 7, wherein said defined current of the first or second additional chain-link circuit has a component based on a DC current demand.

10. The voltage source converter as claimed in claim 1, wherein the converter controller is configured to control each phase limb to generate a trapezoidal voltage waveform at the AC node.

11. The voltage source converter as claimed in claim 10, wherein a duration of the controlled voltage transition from a midpoint voltage to a voltage of the high DC terminal or the low DC terminal corresponds to a difference in phase angle of greater than $\pi/6$.

12. The voltage source converter as claimed in claim 10, wherein the trapezoidal voltage waveform has at least two different slopes during the controlled voltage transition.

13. The voltage source converter as claimed in claim 1, wherein the energy storage elements of the chain-link modules comprise capacitors and wherein the converter controller comprises a capacitor balancing controller for maintaining a voltage of the capacitors within predefined limits.

14. The voltage source converter as claimed in claim 13 wherein the converter controller is configured to control the chain-link circuits such that, in each a plurality of converter switch states, a compensation current flows between the high and low DC terminals via at least two chain-link circuits wherein the sum of the compensation current flowing through each chain-link circuit over a switching cycle of the voltage source converter maintains the voltage of the capacitors within predefined limits.

15. The voltage source converter as claimed in claim 13, wherein the capacitor balancing controller is configured to determine a value for a compensation current required to maintain the voltage of the capacitors within predefined limits and the defined current of a chain-link circuit operating in current mode comprises a component based on said compensation current value.

16. The voltage source converter as claimed in claim 15 wherein the converter controller is configured to adjust a DC current demand of the voltage source converter based on said compensation current value.

17. The voltage source converter as claimed in claim 15, wherein the capacitor balancing controller is configured to determine a compensation current requirement for each chain-link circuit and determine said compensation current value based on the switch states of each of the phase limbs of the voltage source converter.

18. The voltage source converter as claimed in claim 17 wherein the voltage source converter has three phase limbs and is operable in use in a switch state in which:

two chain-link circuits are operating in current mode; and
one phase limb is operating in voltage mode;
wherein, when the voltage source converter is operating in such a switch state the compensation current value is based on a compensation current requirement for the chain-link circuits operating in current mode added together minus a compensation current requirement for the chain-link circuit operating in voltage mode.

19. The voltage source converter as claimed in claim 17, wherein the voltage source converter has three phase limbs and is operable in use in a switch state in which:

all three chain-link circuits are operating in current mode, with two phase limbs in the same state and the other phase limb in the opposite state;
wherein, when the voltage source converter is operating in such a switch state the compensation current value is based on three times the compensation current requirement for the chain-link circuit of the phase in the opposite state minus the compensation current requirement for each of the two other phases.

20. The voltage source converter as claimed in claim 17, wherein the voltage source converter has three phase limbs and is operable in use in a switch state in which:

only one chain-link circuit of the phase limb is operating in current mode;
wherein, when the voltage source converter is operating in such a switch state the compensation current value is based on the compensation current requirement for that chain-link circuit.

21. The voltage source converter as claimed in claim 17, wherein the capacitor balancing controller is configured to monitor the voltages of the capacitors of the chain-link circuits and compare determined voltages with a reference value to determine an error value, wherein the compensation current requirement is based on said error signal.

22. A method of operating a voltage source converter having:

a plurality of phase limbs connected between high and low DC terminals;
wherein each phase limb comprises:
a high side director switch connecting the high side DC terminal to an AC node for that phase limb; and a low side director switch connecting the AC node to the low DC terminal; and a chain-link circuit comprising a plurality of series-connected chain-link modules, a first end of the chain-link circuit being directly connected between the high and low director switches to be electrically coupled to the AC node;

first and second additional chain-link circuits, where first ends of the first and second additional chain-link circuits are connected to the high side DC terminal and low side DC terminals respectively;

wherein each of the chain-link circuits comprise at least one energy storage element that can be selectively connected in series with the other modules or bypassed, and a second end of each of the chain-link circuits is connected to a common node such that, in use, a current can flow from one phase limb to another via the respective chain-link circuits;

wherein the method comprises:

controlling the director switches in a power cycle and controlling the chain-link circuits of each phase limb in a voltage mode to provide a controlled voltage transition at the AC node during the power cycle; and operating at least one chain-link circuit in a current mode to provide a defined chain-link current at times during the power cycle.

\* \* \* \* \*